United States Patent
Lovlekar et al.

(10) Patent No.: US 10,512,025 B2
(45) Date of Patent: Dec. 17, 2019

(54) ACTIVITY MODE FOR A CELLULAR CONNECTION

(71) Applicant: APPLE INC., Cupertino, CA (US)

(72) Inventors: Srirang A. Lovlekar, Cupertino, CA (US); Vijay Venkataraman, San Jose, CA (US); Murtaza A. Shikari, Mountain View, CA (US); Srinivas Burugupalli, Union City, CA (US); Vijay Kumar Ramamurthi, Milpitas, CA (US); Srinivasan Nimmala, San Jose, CA (US); Sethuraman Gurumoorthy, San Jose, CA (US); Muthukumaran Dhanapal, Dublin, CA (US); Longda Xing, San Jose, CA (US); Ajoy K. Singh, Milpitas, CA (US); Jesus A. Gutierrez Gomez, Sunnyvale, CA (US); Saran Krishnaswamy, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/812,369

(22) Filed: Nov. 14, 2017

(65) Prior Publication Data

US 2019/0150060 A1    May 16, 2019

(51) Int. Cl.
*H04W 48/02* (2009.01)
*H04W 52/02* (2009.01)
*H04M 1/725* (2006.01)
*H04W 4/90* (2018.01)

(52) U.S. Cl.
CPC ....... *H04W 48/02* (2013.01); *H04M 1/72569* (2013.01); *H04M 1/72577* (2013.01); *H04W 4/90* (2018.02); *H04W 52/0254* (2013.01)

(58) Field of Classification Search
CPC ... H04W 48/02; H04W 4/90; H04W 52/0254; H04W 4/22; H04M 1/72577; H04M 1/72569
See application file for complete search history.

(56) References Cited

U.S. PATENT DOCUMENTS

| | | | | |
|---|---|---|---|---|
| 6,317,593 B1 * | 11/2001 | Vossler | ................. | H04M 1/663 455/414.1 |
| 6,928,300 B1 * | 8/2005 | Skinner | ................. | G06F 1/1626 340/4.5 |
| 7,084,758 B1 * | 8/2006 | Cole | .................... | G06Q 10/109 340/309.16 |
| 7,248,885 B2 * | 7/2007 | Benco | ................... | H04M 3/436 455/456.4 |
| 7,929,921 B2 * | 4/2011 | Love | .................... | H04B 7/0814 455/101 |
| 8,245,066 B1 * | 8/2012 | Sharkey | ................ | G06F 1/3203 713/310 |

(Continued)

*Primary Examiner* — Babar Sarwar
(74) *Attorney, Agent, or Firm* — Fay Kaplun & Marcin, LLP

(57) ABSTRACT

A device sets an activity mode for a cellular connection. A method to set the activity mode is performed at a device located with a user that is configured to establish a network connection to a network. The method includes determining a status of the user, the status indicating an activity state or a non-activity state of the user. The method includes, when the status indicates the activity state, activating an activity mode on the device that restricts select types of mobile originating data traffic.

20 Claims, 8 Drawing Sheets

(56) References Cited

U.S. PATENT DOCUMENTS

| | | | | |
|---|---|---|---|---|
| 8,352,296 B2* | 1/2013 | Taneja | G06Q 50/188 | 705/5 |
| 8,386,949 B2* | 2/2013 | Baek | G06F 3/0485 | 715/769 |
| 9,860,750 B2* | 1/2018 | Goel | H04W 76/38 | |
| 2003/0143992 A1* | 7/2003 | Humphrey | H04M 1/7253 | 455/420 |
| 2004/0097218 A1* | 5/2004 | Vossler | H04M 1/663 | 455/418 |
| 2004/0162882 A1* | 8/2004 | Mora | G06Q 10/10 | 709/207 |
| 2004/0203935 A1* | 10/2004 | Dowling | H04M 1/645 | 455/458 |
| 2004/0243430 A1* | 12/2004 | Horstemeyer | B60R 25/102 | 340/928 |
| 2005/0020314 A1* | 1/2005 | Choi | H04M 1/72566 | 455/564 |
| 2005/0221828 A1* | 10/2005 | Wakuta | H04W 36/30 | 455/437 |
| 2006/0171350 A1* | 8/2006 | Taniguchi | H04L 12/1417 | 370/328 |
| 2006/0171396 A1* | 8/2006 | Singh | H04W 28/06 | 370/394 |
| 2007/0037610 A1* | 2/2007 | Logan | H04M 1/72563 | 455/574 |
| 2008/0057894 A1* | 3/2008 | Aleksic | H02J 9/002 | 455/187.1 |
| 2009/0132662 A1* | 5/2009 | Sheridan | G06Q 10/107 | 709/206 |
| 2009/0239574 A1* | 9/2009 | Hussain | H04W 52/0229 | 455/552.1 |
| 2011/0034158 A1* | 2/2011 | Bradley | G06Q 10/10 | 455/418 |
| 2011/0086614 A1* | 4/2011 | Brisebois | H04K 3/42 | 455/411 |
| 2011/0092212 A1* | 4/2011 | Kubota | H04W 52/0225 | 455/436 |
| 2011/0319072 A1* | 12/2011 | Ekici | H04W 48/18 | 455/426.1 |
| 2012/0116550 A1* | 5/2012 | Hoffman | A63B 24/0084 | 700/91 |
| 2012/0169637 A1* | 7/2012 | Jeong | G09G 3/3406 | 345/173 |
| 2012/0184246 A1* | 7/2012 | Miwa | H04M 1/72544 | 455/410 |
| 2012/0315960 A1* | 12/2012 | Kim | H04W 52/0254 | 455/574 |
| 2013/0054090 A1* | 2/2013 | Shin | B60K 28/06 | 701/36 |
| 2013/0065562 A1* | 3/2013 | Singh | H04L 12/1492 | 455/414.1 |
| 2013/0084869 A1* | 4/2013 | Johansson | H04W 76/20 | 455/436 |
| 2013/0143512 A1* | 6/2013 | Hernandez | H04W 4/00 | 455/404.1 |
| 2013/0329554 A1* | 12/2013 | Centoza | H04W 28/08 | 370/230.1 |
| 2014/0101611 A1* | 4/2014 | Lang | G06F 21/32 | 715/813 |
| 2014/0194086 A1* | 7/2014 | Alam | H04W 52/0254 | 455/405 |
| 2014/0203077 A1* | 7/2014 | Gadh | H02J 7/00 | 235/382 |
| 2014/0336925 A1* | 11/2014 | Akin | G01C 21/00 | 701/457 |
| 2015/0146694 A1* | 5/2015 | Gopal | H04W 36/0083 | 370/332 |
| 2015/0163811 A1* | 6/2015 | Konstantinou | H04W 76/16 | 370/329 |
| 2015/0194124 A1* | 7/2015 | Yamauchi | H04M 1/6083 | 345/211 |
| 2015/0262132 A1* | 9/2015 | Miller | G06Q 10/1097 | 705/7.15 |
| 2015/0297134 A1* | 10/2015 | Albert | A61B 5/681 | 600/384 |
| 2016/0006861 A1* | 1/2016 | Hodges | H04M 1/72577 | 455/405 |
| 2016/0073286 A1* | 3/2016 | Wang | H04W 28/0236 | 370/332 |
| 2016/0183085 A1* | 6/2016 | Yerrabommanahalli | H04W 12/04 | 713/153 |
| 2016/0198364 A1* | 7/2016 | Schwarzbauer | H04W 28/08 | 370/331 |
| 2016/0262205 A1* | 9/2016 | Flynn | H04W 52/0212 | |
| 2016/0316425 A1* | 10/2016 | Cili | H04W 24/08 | |
| 2016/0334231 A1* | 11/2016 | McDonnell | G08B 25/016 | |
| 2017/0055118 A1* | 2/2017 | Ciecko | H04W 4/021 | |
| 2017/0099592 A1* | 4/2017 | Loeb | H04L 67/303 | |
| 2017/0109706 A1* | 4/2017 | Sankaran | H04W 4/027 | |

* cited by examiner

ACTIVITY MODE FOR A CELLULAR CONNECTION

BACKGROUND INFORMATION

A user equipment (UE) may be configured to establish a connection to at least one of a plurality of different networks or types of networks as well as with other UEs to perform a variety of different functionalities via the connection. For example, the UE may connect to a first type of network (e.g., Long Term Evolution (LTE) network) to communicate with another UE through the network connection (e.g., a user of the UE may perform a voice call or transmit a text to another user of another UE). In another example, the UE may connect to a second type of network (e.g., WiFi network) to receive browser data at a higher rate of data exchange. In a further example, the UE may directly connect to a further UE using a short-range communication protocol (e.g., BlueTooth).

With the UE being mobile, the UE may be utilized in various different locations while the user of the UE is performing any of a variety of different activities. For example, the user of the UE may be performing an activity, an exercise, a physical action, etc. (hereinafter collectively referred to as an "activity") while the UE is kept on the person of the user or is worn by the user. The UE may be configured to enable the user to track a progress of performing the activity. For example, the UE may track a distance traveled, a time spent, body measurements, etc. However, during the activity, the UE may be exposed to conditions that cause connection problems with the various networks. For example, the UE may have an increased mobility, may be located within an indoor facility, may be disposed in a liquid environment (e.g., while swimming), etc. The UE may also have a combination of these conditions. Accordingly, the UE may ultimately be required to perform many different operations in attempting to establish a connection which may lead to adverse outcomes, increased usage of a limited power supply, and a poor user experience.

SUMMARY

The exemplary embodiments are directed to a method, comprising: at a device that is configured to establish a network connection to a network, the device located with a user: determining a status of the user, the status indicating an activity state or a non-activity state of the user; and when the status indicates the activity state, activating an activity mode on the device that restricts select types of mobile originating data traffic.

The exemplary embodiments are directed to a device located with a user, the device comprising: a transceiver configured to establish a connection to a network; and a processor determining a status of the user, the status indicating an activity state or a non-activity state of the user, when the status indicates the activity state, the processor activating an activity mode on the device that restricts select types of mobile originating data traffic.

The exemplary embodiments are directed to a device located with a user, the device comprising: first circuitry for establishing a connection to a network; second circuitry for determining a status of the user, the status indicating an activity state or a non-activity state of the user; and when the status indicates the activity state, third circuitry for activating an activity mode on the device that restricts select types of mobile originating data traffic.

DETAILED DESCRIPTION

Figure 1:
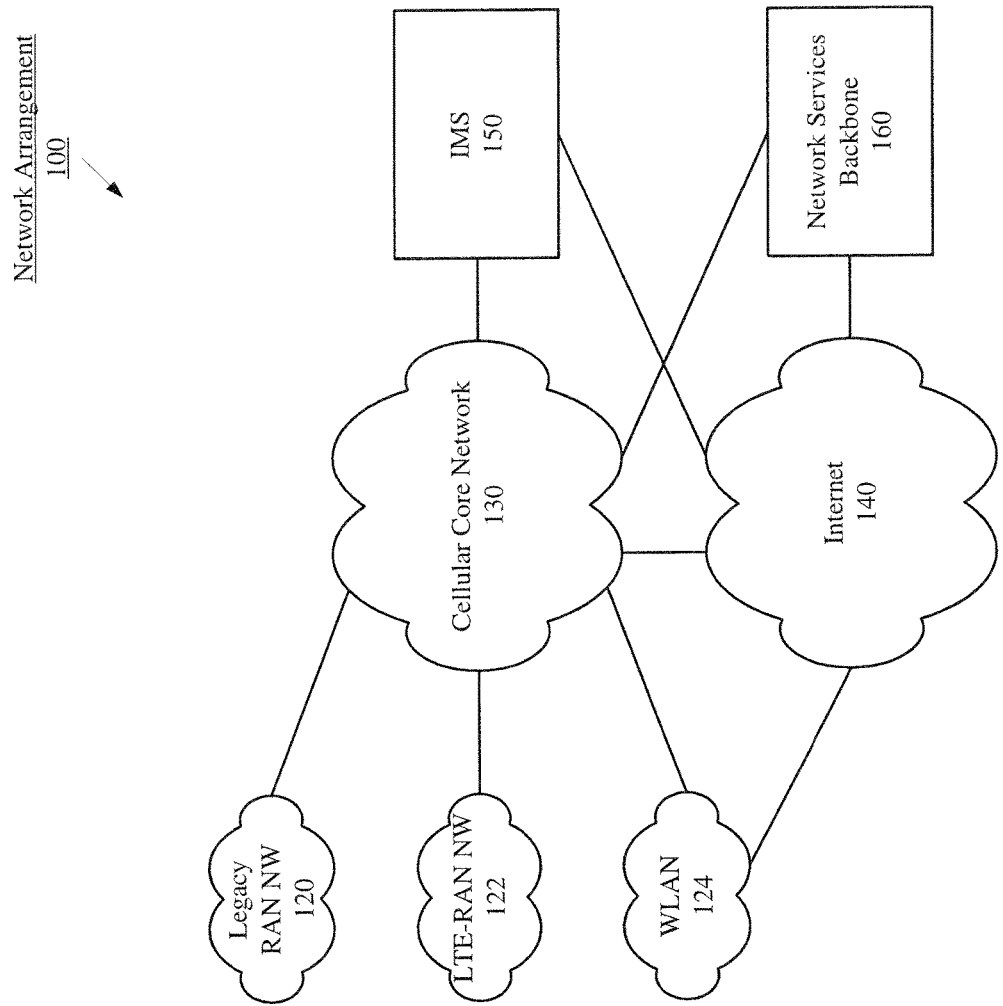
FIG. 1 shows an example network arrangement according to various exemplary embodiments described herein.
Figure 1:
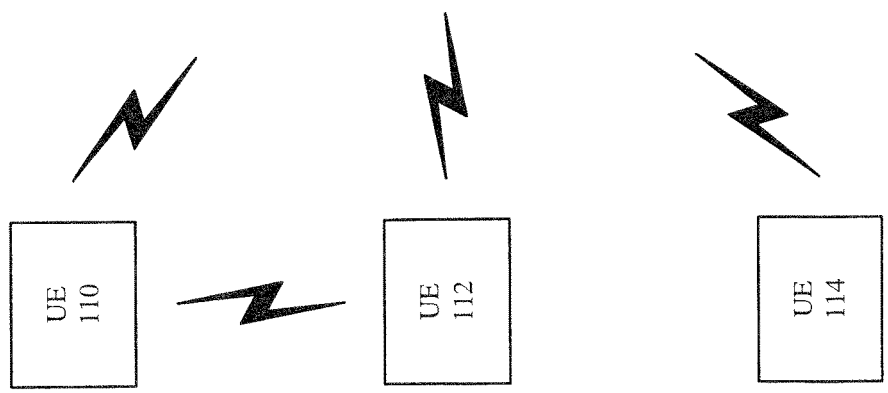

The exemplary embodiments may be further understood with reference to the following description and the related appended drawings, wherein like elements are provided with the same reference numerals. The exemplary embodiments are related to a device, system, and method for utilizing an activity mode of operation on a user equipment (UE) when a user is participating in an activity. For example, the UE may be with the user during the activity (e.g., the UE is worn by the user). While the user is performing the activity, the UE may also be capable of connecting to a network (e.g., a Long Term Evolution (LTE) network) or another UE but may experience difficulty while attempting to establish such connections. Accordingly, the exemplary embodiments provide a plurality of different mechanisms to compensate for adverse outcomes while attempting to establish a connection due to the conditions of performing the activity. As will be described in further detail below, a first mechanism may utilize a first activity mode in which a setting of the UE changes based on a status of the activity. A second mechanism may utilize a second activity mode in which a network lock is used while the activity is occurring or will occur. A third mechanism may utilize a third activity mode in which an indication of the activity may trigger an emergency mode of operation.

Initially, it is noted that the exemplary embodiments are described with regard to a UE. However, the UE is only exemplary. The exemplary embodiments may be utilized with any device that may establish a connection to one or more networks and/or one or more further UEs as well as configured with the hardware, software, and/or firmware to perform connection establishment attempts. Therefore, the UE as described herein is used to represent any device capable of establishing a connection.

It is also noted that the exemplary embodiments are described to include scenarios in which the UE has a companion UE where the UE is a slave and the companion UE is a master or vice versa. Accordingly, when the UE and the companion UE are connected to one another over a short-range communication pathway, the UE may receive data via the companion UE while deactivating any network capabilities to a cellular network and/or a WiFi network. When the UE and the companion UE are not connected, the UE may exchange data over any network to which it is configured to connect (instead of through the companion UE). However, the use of the UE and the companion UE is only exemplary. The exemplary embodiments may be utilized for any UE (with or without a companion UE) and represent any device. Furthermore, for illustrative purposes, the exemplary embodiments are described with regard to the UE attempting to establish a connection with a network. However, those skilled in the art will understand that the exemplary embodiments may also be used for or in combination with attempts to connect to a further UE.

During an activity, a UE may experience signal fluctuations on supported network technologies. For example, the UE may be a wearable device worn on a user's wrist. Thus, while free style swimming, with each stroke of the arm, the UE may alternate between being submerged in water and exposed to air. The alternating between the medium in which the UE is disposed may create the conditions for signal fluctuation (e.g., water attenuation while submerged). The signal fluctuations may lead to an intersystem ping pong effect. Those skilled in the art will understand that the intersystem ping pong effect relates to when the UE experiences a plurality of handovers between different networks. The signal fluctuation may result in the UE having a first condition in which the connection may appear satisfactory but subsequent network metric measurements may result in the UE having a second condition in which the connection may appear unsatisfactory, thereby prompting the handover. Particularly, when the UE is subject to a cyclical motion and alternates between good signal conditions and poor signal conditions, the UE may drop connections and perform various operations to compensate for these changing conditions.

When the above scenario exists, the UE may perform excessive radio resource control (RRC) connections for tracking area updates (for LTE networks) and/or routing area updates (for non-LTE networks). Furthermore, a chain reaction may occur where this scenario also results in increased cell ping-pongs/reselections (e.g., at times, between tracking area boundaries), radio link failures (RLFs), handover (HO) failures, random access channel (RACH) failures, and increased out of service (OOS) events. All of these results and corresponding operations also consume a large amount of power. In addition, background traffic originated by the UE may further aggravate the situation caused by the operations performed by the UE due to the signal fluctuations. For example, the background traffic may aggravate the operations associated with RRC connections and result in failure conditions with respect to RLFs, OOS events, HO failures, RACH failures, etc. The participation in the activity (which may entail repeated actions) gives rise to the above cycle and high power consumption. For example, experimentation from a user swimming demonstrates increased RRC attempts per period of time, an increase percentage where the UE is in a connected mode, and an increased battery drain due to the above operations and failures.

In view of the above adverse outcomes from the UE being present while the user is performing an activity, the exemplary embodiments provide an activity mode to resolve the excessive power consumption and increased use of operations in establishing a network connection by applying baseband mitigations. As will be described in further detail below, the exemplary embodiments may determine when the user will start an activity, is performing the activity, has paused performance of the activity, and has ended the activity. Based on the status of the activity, the exemplary embodiments may utilize the appropriate setting for the activity mode corresponding to the activity status. In this manner, the appropriate baseband mitigations may be used to provide the UE with the most capabilities during the activity.

FIG. 1 shows a network arrangement 100 according to the exemplary embodiments. The network arrangement 100 includes UEs 110-114. Those skilled in the art will understand that the UEs 110-114 may be any type of electronic component that is configured to communicate via a network, e.g., mobile phones, tablet computers, desktop computers, smartphones, phablets, embedded devices, wearable devices, Cat-M devices, Cat-Mi devices, MTC devices, eMTC devices, etc. It should also be understood that an actual network arrangement may include any number of UEs being used by any number of users and being associated with any number of these users where the user may be associated with one or more of the UEs. That is, the example of three (3) UEs 110-114 is only provided for illustrative purposes.

Each of the UEs 110-114 may be configured to communicate directly with one or more networks. In this example, the networks with which the UEs 110-114 may wirelessly communicate are a legacy radio access network (RAN) 120 (e.g., a 3G network), a LTE RAN (LTE-RAN) 122, and a wireless local area network (WLAN) 124 (e.g., a WiFi network). However, it should be understood that the UEs 110-114 may also communicate with other types of networks (e.g., 5G networks). With regards to the exemplary embodiments, the UEs 110-114 may establish a connection with one or more of the legacy RAN 120, the LTE-RAN 122, and the WLAN 124. For example, the UEs 110-114 may have a legacy chipset, a LTE chipset, and/or a WiFi chipset that are used to communicate with the legacy RAN 120, the LTE-RAN 122, and/or the WLAN 124, respectively. The use of three (3) networks is only exemplary and there may be any other number of networks with which the UEs 110-114 may communicate.

Each of the UEs 110-114 may also be configured to communicate with the other UEs 110-114 without using the networks 120-124. For example, as illustrated, the UE 110 may communicate with the UE 112 using a short-range communication protocol such as BlueTooth. Thus, if the UE 110 and the UE 112 are within a proximity of one another (e.g., within a distance in which BlueTooth communications may be performed), the UE 110 and the UE 112 may exchange data. In a specific exemplary embodiment, if the short-range communication protocol is being used, the UE 110 and the UE 112 may have a companion relationship where the UE 110 is a slave and the UE 112 is a master. Thus, the UE 110 may utilize only the short-range communication protocol without connecting to any of the networks 120-124 while the UE 112 may connect to one or more of the networks 120-124 and relay data exchanged between the networks 120-124 and the UE 112 to the UE 110 over the short-range communication pathway. However, it is again noted that the use of a companion relationship is only exemplary and the UE 110 may connect to one or more of the networks 120-124 whether or not the UE 110 is within range of communicating with the UE 112 over the short-range communication pathway. It is also again noted that the exemplary embodiments are described with regard to a network connection to one of the legacy RAN 120, the LTE-RAN 122, or the WLAN 124. When the companion relationship is used, it may be assumed that the UEs in the companion relationship are not utilizing the short-range communication protocol (e.g., separated from one another).

The legacy RAN 120 and the LTE-RAN 122 are portions of cellular networks that may be deployed by cellular providers (e.g., Verizon, AT&T, Sprint, T-Mobile, etc.). These networks 120 and 122 may include, for example, base client stations (Node Bs, eNodeBs, HeNBs, gNBs, etc.) that are configured to send and receive traffic from UEs that are equipped with the appropriate cellular chip set. The WLAN 124 may include any type of wireless local area network (e.g., WiFi, Hot Spot, IEEE 802.11x networks, etc.).

In addition to the networks 120-124, the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UEs 110-114 using the IP protocol. The IMS 150 may communicate with the cellular core network 130 and the Internet 140 to provide the multimedia services to the UEs 110-114. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UEs 110-114 in communication with the various networks. The network services backbone 160 may interact with the UEs 110-114 and/or the networks 120, 122, 124, 130, 140 to provide these extended functionalities.

Figure 2:
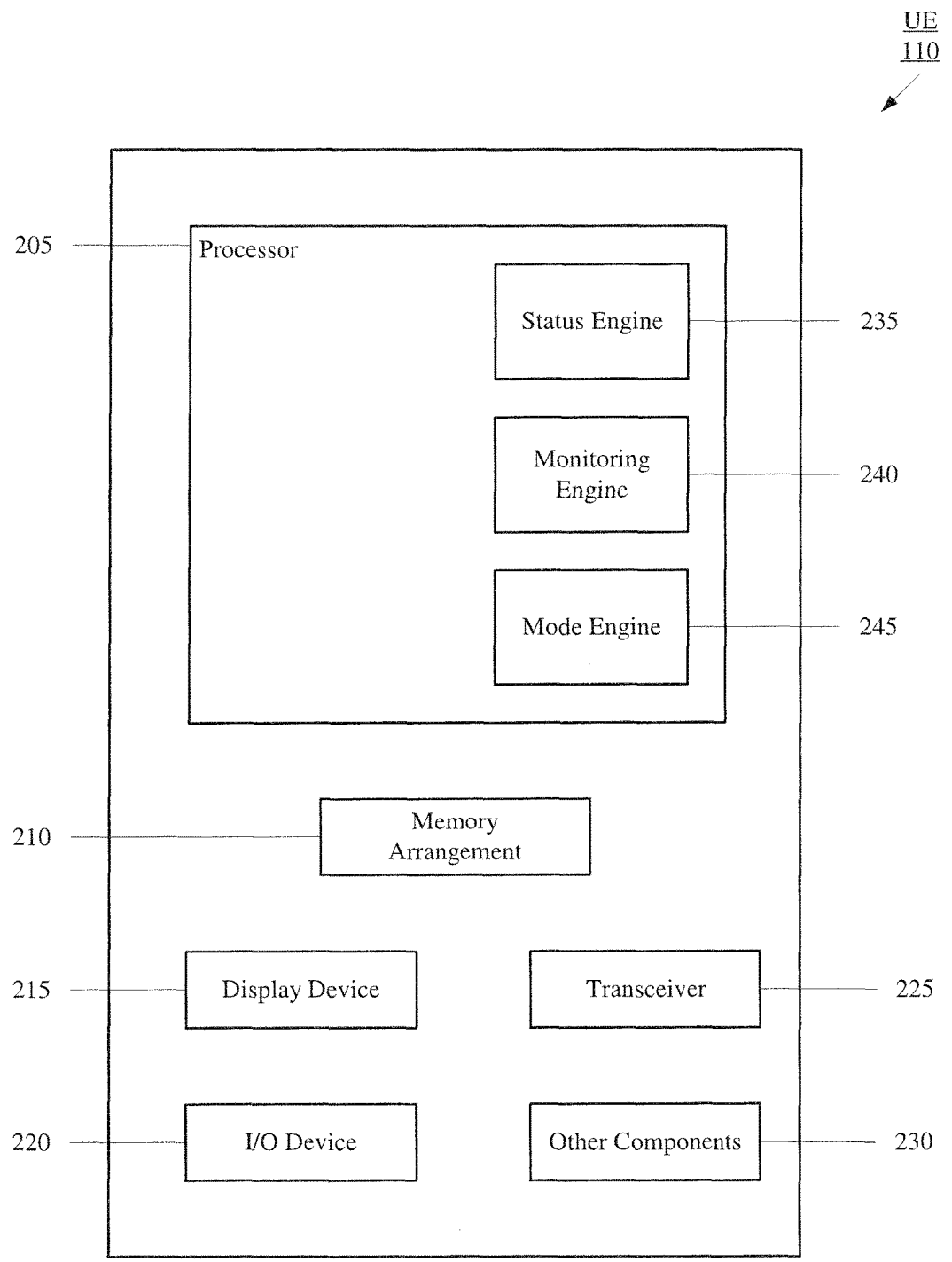
FIG. 2 shows an example user equipment according to various exemplary embodiments described herein.

The exemplary embodiments relate to the UE 110 determining when an activity is being performed by a user while the UE 110 is with the user (e.g., worn) and subsequently placing the UE 110 into an activity mode based on the determination of an activity status. FIG. 2 shows the UE 110 of the network arrangement 100 of FIG. 1 according to the exemplary embodiments. The UE 110 is configured to execute a plurality of applications that perform functionalities to utilize the activity mode. It is noted that the UE 110 being configured with the features of the exemplary embodiments is only exemplary. That is, the UE 110 may also represent the UEs 112, 114.

The UE 110 may represent any electronic device that is configured to perform wireless functionalities and may be representative of one or more of the UEs 110-114 (examples of which are noted above). The UE 110 may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, etc.

The processor 205 may be configured to execute a plurality of engines of the UE 110. For example, the applications may include a status engine 235, a monitoring engine 240, and a mode engine 245. The status engine 235 may be configured to determine an activity status. The activity status may relate to whether the user of the UE 110 will begin or is performing the activity as well as whether the user of the UE 110 has paused or ended the activity. The monitoring engine 240 may be configured to measure different metrics. The metrics may include network metrics associated with connections and attempts to connect to the network. The mode engine 245 may be configured to determine the setting of the activity mode to be used by the UE 110 based on the outputs of the status engine 235 and the monitoring engine 240.

It should be noted that the above noted engines each being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. In addition, in some UEs, the functionality described for the processor 205 is split among two processors, a baseband processor and an applications processor, as will be described in further detail below. The exemplary embodiments may be implemented in any of these or other configurations of a UE.

The memory 210 may be a hardware component configured to store data related to operations performed by the UE 110. As will be described in further detail below, the memory 210 may store data associated with connections and connection attempts to the different RATs that the UE 110 is capable of connecting. The display device 215 may be a hardware component configured to show data to a user while the I/O device 220 may be a hardware component that enables the user to enter inputs. It should be noted that the display device 215 and the I/O device 220 may be separate components or integrated together such as a touchscreen. The transceiver 225 may be a hardware component configured to establish a connection with at least one of a base station associated with the legacy RAN 120, a base station of the LTE-RAN 122 (e.g., an evolved Node B (eNB)), a router of a WLAN 124, the UE 112, etc. Accordingly, the transceiver 225 may operate on a variety of different frequencies or channels (e.g., set of consecutive frequencies).

As described above, the status engine 235 may be configured to determine an activity status indicating whether the user of the UE 110 will begin an activity, is performing the activity, has paused performing the activity, or has ended the activity. The status engine 235 may be capable of determining the activity status utilizing a plurality of different mechanisms. As will be described in further detail below, the UE 110 may include applications in which a user manually provides an input indicating the activity status. The UE 110 may also include further components (e.g., in the other components 130) that are used by the status engine 235 to automatically determine the activity status.

The user may utilize an activity application installed on the UE 110 to manually identify the activity status. For example, the activity application may include a plurality of features that tracks a progress of an activity being performed. The progress may be for a current activity as well as a historical progress of one or more previous activities. The activity application may be capable of tracking a plurality of different parameters related to the user and/or the activity. For example, in addition to the activity status, the activity application may track a distance traveled, a time the activity has been performed, a heart rate, a body temperature, etc.

In one manner of utilizing the activity application to determine the activity status, the user may manually enter an input indicating a current moment of the activity. For example, the user may initiate, exit, pause, or resume use of the activity application. In this manner, the user may identify when the user will begin performing the activity, end the activity, temporarily stop performing the activity, and when the activity is being performed. A corresponding signal may be received by the status engine 235.

In a second manner of utilizing the activity application to determine the activity status, the status engine 235 may utilize data/metadata of the activity application to determine the activity status. This may be considered an automatic approach using the activity application. Those skilled in the art will understand that the activity application may be continuously running on the UE 110 to track a user's body throughout the day. Thus, inputs for a specific activity being performed may not be available. However, in tracking the user's body, the activity application may generate the data/metadata for the physical attributes of the user or for the activities being performed throughout the day. For example, when certain parameters are measured (e.g., increased heart rate, distance traveled, etc.), the status engine 235 may determine that an activity is being performed. It is noted that the status engine 235 may utilize historical parameters to form a baseline of resting measurements specific to the user to determine when an activity is being performed.

As noted above, the activity status may be automatically identified using any of a variety of other manners based on available technologies on the UE 110. In a first example, the status engine 235 may perform an implicit detection of when an activity starts/ends based on metrics measured by a cellular baseband. For example, the metrics may include measurements in a predetermined time interval (e.g., N seconds) where the measurements may include a receiving channel signal variation/stabilization (e.g., received signal received power (RSRP) in LTE, a received signal code power (RSCP) in WDMA, etc.), a number of OOS events, a number of RLFs, a number of intra- and inter-system selections/re-selections, a number of inter-RAT ping pongs, signal variations above a specified delta, etc. The status engine 235 may identify patterns in these metrics to determine when the UE 110 is with a user performing an activity. For example, when the number of OOS events exceeds a predetermined threshold within the predetermined time interval, the status engine 235 may determine that an activity is being performed. The patterns may be different for different activities and the status engine 235 may be configured to dynamically determine the pattern for the different activity types (e.g., based on historical measurement information). Accordingly, each of the metrics may have a corresponding threshold for a corresponding activity type.

In using these metrics, the activity status may be determined to be that the user is performing the activity. For example, it may be that each of a combination of the metrics satisfies the respective threshold. The combination may include the number of RLFs, the number of OOS events, the number of cell (re)selections, the number of signal variations, and the number of inter-RAT ping pongs. When all of these metrics satisfy their respective thresholds, the status engine 235 may determine that the activity is not being performed. For example, the user may be in non-activity, the user may intend to start the activity but has not yet started performing the activity, the user has paused performing the activity, etc. However, if any one (or more) of the above metrics in the combination does not satisfy the respective threshold, the status engine 235 may determine that the user is performing the activity. It is noted that the use of a combination of metrics is only exemplary. According to further exemplary embodiments, the status engine 235 may be implemented with any different set of metrics in the combination, use any one individual metric, etc.

In a second example, the UE 110 may include a further component that provides information related to activities performed by the user of the UE 110. For example, the UE 110 may include a motion co-processor that detects specific activities. The motion co-processor may detect hand movements for different swim strokes while a user is swimming. The status engine 235 may receive the information from the motion co-processor and determine that the activity is being performed by the user. This scenario may be related to when the UE 110 is a wearable device and worn on the user's wrist/hand. In another example, the UE 110 may include a sensor configured to detect respective conditions related to an environment of the UE 110, the body of the user, a disposition of the UE 110, etc. The sensor may be a water monitor, a heart rate detector, a location application (e.g., GPS), etc. These sensors may have specific patterns in their output for different types of activities (e.g., sensing a submerging in water, detecting an increase/decrease to heart rate, an identification of a location or change in location over time such as a circular path while running or back and forth while swimming, etc.). The sensors may enable the status engine 235 to detect the activity status when the user engages in a given activity without explicitly initiating an activity application or providing an input on the activity application.

It is noted that the manual and automated approaches may result in conflicting activities being determined, especially when more than one of the above mechanisms is being used concurrently to determine the user performing an activity. For example, a first activity application may identify outdoor walking while a second activity application may identify indoor walking. The status engine 235 may be configured in a manual or automated way to prioritize the inputs from the various sources of the mechanisms to determine the activity status. Thus, when conflicting activities are determined, the status engine 235 may select and/or ignore certain inputs.

The monitoring engine 240 may be configured to measure different metrics such as network metrics associated with connections and attempts to connect to the network. As noted above, the monitoring engine 240 may measure a plurality of different network metrics including a number of events such as RLFs, HO failures, RACH failures, OOS events, etc. The monitoring engine 240 may also measure a plurality of different network metrics including quality metric such as RSRP, received signal strength indication (RSSI), received signal received quality (RSRP), power headroom (PHR), block error rate (BER), packet error rate (PER), etc. As noted above and as will be described in detail below, the monitoring engine 240 may be used in a variety of different opportunities to provide information that indicates the manner in which an activity mode is used.

The mode engine 245 may be configured to determine the setting of the activity mode to be used by the UE 110 based on the outputs of the status engine 235 and the monitoring engine 240. As noted above, the mode engine 245 may be configured to utilize a plurality of different activity modes to compensate for increased power consumption and increase network operations while the UE 110 is with a user performing an activity. Each of the activity modes may include one or more settings by which the respective activity mode may be used based on a current activity status determined by the status engine 235 and/or metrics measured by the monitoring engine 240.

According to a first activity mode, the mode engine 245 may place the UE 110 in a plurality of different settings based on the activity status. Depending on the activity status, the first activity mode may include different settings in which the cellular baseband (e.g., a baseband processor) indicates to an application processor a link quality metric (LQM) or a baseband "willingness" factor to allow data transfers over cellular systems. The LQM may correspond to a signal exchanged from the baseband processor to the application processor based on the activity status.

In a first example, the LQM may be set to an abort setting. The abort setting may indicate an intention of the baseband processor that the application processor is to shut down all non-critical/background data traffic at that instance. For example, the abort setting may be reached when the cost (e.g., power consumption) of the traffic activity to be shut down is very high (e.g., above an acceptable power threshold) at that instance. In contrast, foreground/user initiated data traffic may still be enabled. Thus, the application processor may be configured to control mobile originating (MO) data.

In a second example, the LQM may be set to a high power setting. The high power setting may indicate an intention of the baseband processor that the application processor is to shut down the cellular baseband and use a low power efficient mode. For example, the low power efficient mode may be an emergency mode where emergency messages or indications of emergency messages (e.g., in a page) are allowed to be received (e.g., from a Commercial Mobile Alert System (CMAS) or Earthquake and Tsunami Warning Service (ETWS)). For illustrative purposes, the emergency messages will be described with the CMAS such that the emergency mode is a CMAS mode. In the CMAS mode, in addition to the non-critical/background data traffic, the foreground/user initiated traffic may also be shut down. That is, all UE initiated traffic may be prevented. Incoming data may be analyzed and only emergency related data may be used for subsequent processing while non-emergency related data may be ignored or buffered for later use (when out of the CMAS mode). Thus, the high power setting may be used to prevent an increased amount of power from being used. Accordingly, use of the high power setting allows for a decreased amount of power from being expended.

Using the different settings of the first activity mode, the mode engine 245 may place the UE 110 in the appropriate setting upon receiving the outputs from the status engine 235 and/or the monitoring engine 240. In a first example, the mode engine 245 may determine that the user intends to perform an activity or has paused performing the activity. During this time, the mode engine 245 may set an intermediary setting of the activity mode on the UE 110. For example, when the activity status indicates intention to start the activity or a pause in the activity, the operation of the UE 110 may cause a lower power consumption and amount of network operations than if the activity is being performed. However, there may be a higher power consumption and amount of network operations than if the UE 110 is with the user during non-activity. Thus, in this example, the intermediary setting may be the LQM abort setting.

In a second example, the mode engine 245 may determine that the user is performing the activity. During this time, the mode engine 245 may set a restricted setting of the activity mode on the UE 110. For example, when the activity status indicates the activity is being performed, the operation of the UE 110 may cause a relatively high power consumption and amount of network operations. Thus, in this example, the restricted setting may be the LQM high power setting.

It is noted that the mode engine 245 may be configured with one or more timers. The timers may be used when the LQM high power setting has been set for the activity mode on the UE 110. In a first example, the mode engine 245 may utilize a guard timer. The guard timer may be initiated at the same moment when the LQM high power setting is initiated. The guard timer may be used in the scenario where manual inputs are used to identify the activity status and the user has provided the start of an activity but not provided the end of an activity. Thus, the LQM high power setting may have been set in which the CMAS mode is used but the CMAS mode continues to be used even after the activity has ended. Thus, the guard timer may prevent the CMAS mode from being used for inadvertent durations due to the user forgetting to provide the proper input to update the activity status. The guard timer may also be used generally to prevent the CMAS mode from being used for a prolonged period of time. For example, if the activity is being performed for a relatively long time, the guard timer may allow the mode engine 245 to revert to the LQM abort setting or even a full connect mode in which no control is exerted on mobile originating traffic. The guard timer may be set to any value (e.g., 1 hour, 2 hours, etc.) and may also be set dynamically based on the type of activity being performed.

In a second example, the mode engine 245 may utilize a backoff timer. The backoff timer may be used to prevent the mode engine 245 from using the LQM high power setting (and the CMAS mode) in a continuous manner. For example, if the guard timer has expired and the UE 110 is placed in the LQM abort setting but the UE 110 is still with a user performing an activity (e.g., a network metric is measured and does not satisfy the corresponding threshold), the backoff timer may prevent the mode engine 245 from immediately placing the UE 110 back to the LQM high power setting. Thus, the backoff timer may provide an opportunity for the UE 110 to perform any data exchanges with a network. In an exemplary embodiment, the backoff timer may range from a few seconds (e.g., 20 seconds) to a few minutes.

Figure 3:
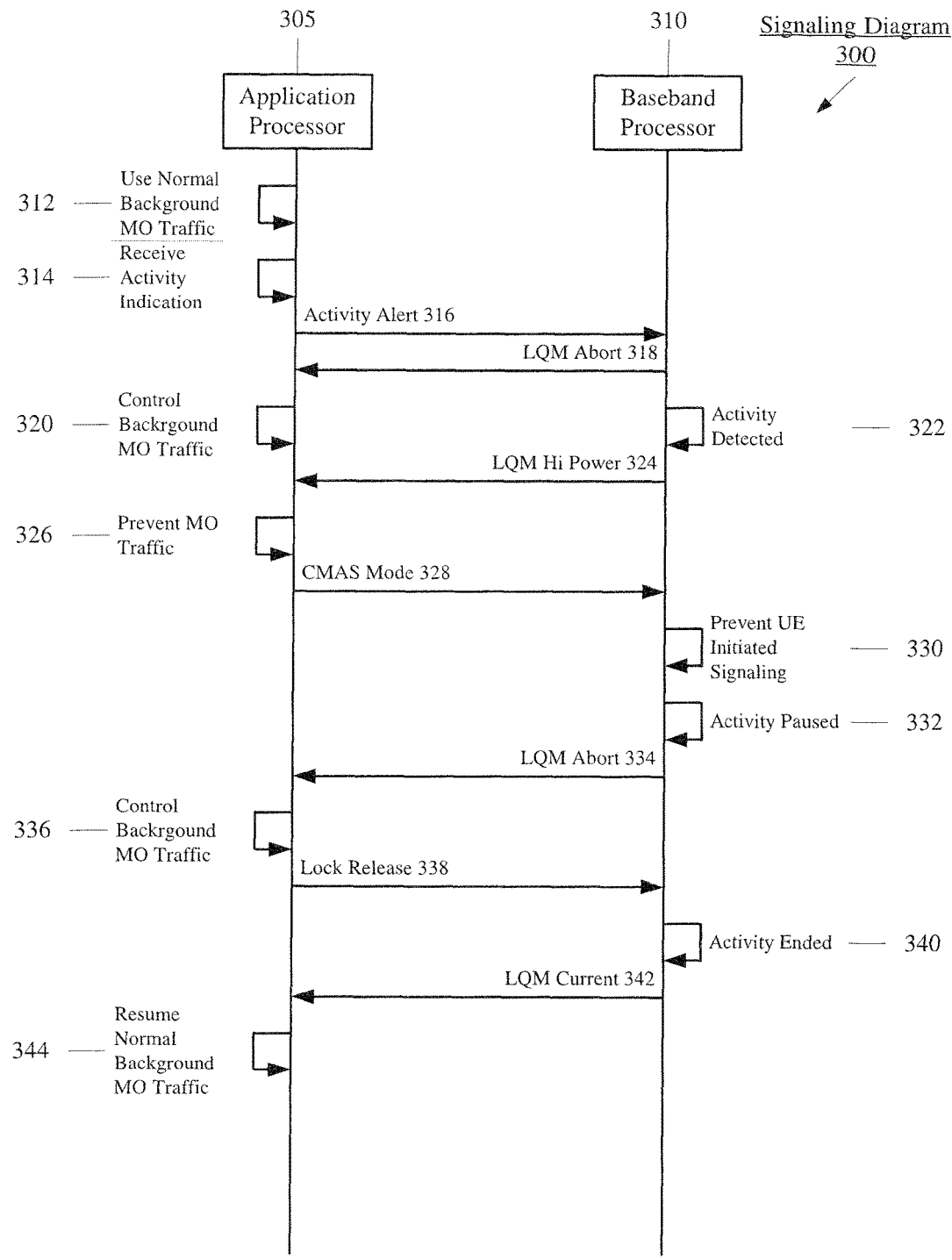
FIG. 3 shows an example first signaling diagram of utilizing a first activity mode according to various exemplary embodiments described herein.

FIG. 3 shows an example first signaling diagram 300 of utilizing the first activity mode according to the various exemplary embodiments described herein. The signaling diagram 300 may relate to a set of operations performed to identify an activity status of the user of the UE 110 such that a proper setting of the first activity mode may be used. The signaling diagram 300 relates to operations performed by an applications processor 305 and a baseband processor 310 of the UE 110. As noted above, the processor 205 may represent both a baseband processor and an applications processor.

Initially, the application processor 305 may use a setting 312 for normal background mobile originating traffic. In this setting, the UE 110 may be configured to receive data and transmit all data, both user initiated and background, whether critical or non-critical. At a subsequent time, the application processor 305 may receive an indication 314 that an activity is to be started. As described above, the UE 110 may include an activity application (e.g., run by the application processor 305) that receives a manual input of an intent of the user to perform an activity. The signal diagram 300 is described with regard to the manual input on the activity application indicating the activity intent. Thus, the application processor 305 provides an activity alert 316 to the baseband processor 310.

When the baseband processor 310 receives the activity alert 316, the baseband processor 310 may determine the LQM. At this instance, the activity alert 316 may refer to an intention to perform an activity with no indication as to whether the activity is being performed. Thus, as noted above, the baseband processor 310 may provide the LQM abort 318 to the application processor 305 for the intermediary setting to be used. When the application processor 305 receives the LQM abort 318, the application processor 305 may still enable incoming data to be received and processed but limit the types of mobile originating traffic by exerting a control 320 on the background and non-critical mobile originating traffic. Again, the control 320 may still allow user initiated mobile originating traffic. For example, if the user decides to originate a voice call, this mobile originating traffic may still be allowed in this state.

At a subsequent time, the baseband processor 310 may detect 322 that the activity has started. As noted above, the activity status of the activity being performed may be determined in a variety of different manners including a manual input on an activity application or through automated determination mechanisms such as measuring network metrics and identifying when a network metric no longer satisfies a corresponding threshold. When the activity has been detected 322, the baseband processor 310 may update the LQM and provide an indication 324 for the LQM high power to the application processor 305. When the application processor 305 receives the indication 324 for the LQM high power, the application processor 305, in 326, may prevent mobile originating traffic. That is, the control may be further restricted such that even user initiated mobile originating traffic is not allowed. Upon this control being set, the application processor 305 may provide an indication 328 for a CMAS mode to the baseband processor 310. When the baseband processor 310 has received the indication 328 for the CMAS mode, the baseband processor 310 may prevent 330 UE initiated signaling to coincide with the control of the application processor 305 for mobile originating traffic. It is noted that the baseband processor 310 may also filter incoming traffic such that only emergency related data is processed. Thus, if an emergency ping or message is received, the application processor 305 and the baseband processor 310 may exit out of any limited setting of the activity mode and revert to a connected mode such that the emergency data may be properly handled (e.g., exchange data with a network to establish a connection for an emergency call). It is noted that the emergency related data may also trigger the application processor 305 and the baseband processor 310 to exit out of both the limited settings corresponding to the LQM abort and the LQM high power.

At a subsequent time, the user may pause or end the activity. For example, the baseband processor 310 may detect 332 that the activity has paused. Even though the activity may have ended, the detection 332 may be an initial determination of when the activity has stopped. Upon detecting 332 that the activity has paused, the baseband processor 310 updates the LQM and provides a LQM abort 334 to the application processor 305. Accordingly, when the application processor 305 receives the LQM abort 334, the application processor 305 updates a control 336 for the mobile originating traffic. That is, user initiated mobile originating traffic may be re-enabled. The application processor 305 may also provide a lock release 338 to the baseband processor 310. The lock release 338 may correspond to an opposite signal to the indication 328 for the CMAS mode. Accordingly, when the baseband processor 310 receives the lock release 338, the baseband processor 310 may again process incoming data without filtering for only emergency related data.

At a subsequent time, the baseband processor 310 may detect 340 that the activity has ended. As noted above, the detection 340 that the activity has ended may be immediately after detecting 332 that the activity was paused. In another manner, the baseband processor 310 may utilize a timer such that upon the detection 332, the timer is initiated and when no change to the activity status is registered, the detection 340 is triggered. With the activity having ended and no more need for the activity mode, the baseband processor 310 may provide an indication 342 for a LQM current which may be an update to the LQM corresponding to a connected mode where all traffic is to be enabled. Thus, when the application processor 305 has received the indication 342 for the LQM current 342, the application processor 305 may return to using a setting 344 for normal background mobile originating traffic in which all mobile originating traffic including non-critical and background traffic is allowed.

According to a second activity mode, the mode engine 245 may place the UE 110 in a network lock to a selected network based on the activity status. When the activity status indicates that the activity is intended to be performed or is being performed, the second activity mode may include a lock to be placed on attempts to connect to a network that limit the types of connection attempts that are allowed. This may be referred to as a network lock.

The network lock may be configured to contain the RRC connections caused due to ping ponging between different RATs. In a particular type of network lock, the mode engine 245 may utilize a RAT lock to limit the RRC connections for RAT ping ponging. Those skilled in the art will understand that RAT ping ponging may be caused by a variety of reasons. In a first example, there may be an inordinate number of RAT (re)selections between WCDMA and LTE (or other pair of networks) and vice versa while the activity is being performed. In a second example, the UE may experience an OOS event on the LTE RAT and come into service on the WCDMA RAT (or other pair of networks) and vice versa while the activity is being performed. In the above examples, the mode engine 245 may set the RAT lock to the LTE network so that the WCDMA reselections do not occur. In this manner, the RAT lock may limit excessive background, keep-alive, and IMS signaling traffic to reduce a number of RRC connections using updates to the LQM from the baseband processor to the application processor. It should be understood that in the above example, the RAT lock may also be set to the WCDMA network.

The RAT lock may prevent excessive baseband signaling from being initiated. However, it is noted that the RAT lock may be released if excessive OOS events are observed to at least provide service to the UE 110 even at the cost of increased power consumption in compensating for the increased OOS events. The mode engine 245 may be configured with a predetermined or dynamic balancing functionality between service and power drain concerns. It is also noted that the RAT lock may be released if an emergency mode is entered to ensure a higher probability of the UE 110 finding emergency service.

In determining the best RAT for the RAT lock, the mode engine 245 may consider a plurality of criteria. In a first exemplary criteria, the mode engine 245 may select a RAT based on the RAT that the UE 110 is camped on when the activity status is updated to indicate the activity is being performed. This criteria may be of particular use for activities such as swimming which are generally performed in restricted geographical areas. In a second exemplary criteria, the mode engine 245 may select a RAT based on capabilities and availabilities (e.g., for voice and SMS services). For example, a network may not support VoLTE. In another example, IMS signaling may fail due to challenging radio conditions or other issues. Accordingly, such considerations may be used as a factor to select a different RAT for the RAT lock (e.g., do not RAT lock to LTE in the area of the activity). In a third exemplary criteria, the mode engine 245 may select a RAT based on an evaluation period. For example, the mode engine 245 may evaluate multiple available RATs over a period of time to detect a number of adverse events on each RAT (e.g., RLFs, RACH failures, other baseband key performance indicators, etc.). At the end of the evaluation period, the mode engine 245 may select the RAT for the RAT lock based on these measurements. In a fourth exemplary criteria, the mode engine 245 may select a RAT based on a static configuration table of the best RAT given the activity, the location, etc. For example, the table may be based on information from a public land mobile network (PLMN). In a fifth exemplary criteria, the mode engine 245 may select a RAT based on a report from crowd-sourced information in the area where the activity is being performed. For example, the report may be based on a database that indicates a reliable RAT in that area. In this manner, the mode engine 245 may select the RAT for the RAT lock using any one or more of the criteria described above.

The RAT lock to a selected RAT may be used in a variety of different manners. In a first example, the UE 110 may utilize the RAT lock based on whether the UE 110 is in service or OOS. While the UE 110 is in service, the RAT lock may be performed by utilizing a determination functionality to select a RAT from available RATs under the current conditions of the UE 110. Once the RAT is selected, the UE 110 may use the RAT lock on this selected RAT. However, while the UE 110 is OOS, the RAT lock may be performed by selecting a last camped RAT. While OOS, the UE 110 may not be capable of detecting available RATs. Therefore, to utilize the features of the second activity mode according to the exemplary embodiments, the UE 110 may select the last camped RAT on which to lock.

In a second example of using the RAT lock, the UE 110 may incorporate a timer. Specifically, the timer may be a RAT unlock OOS (RUO) timer. The RUO timer may address scenarios where the UE 110 is OOS. The RUO timer may also address scenarios where the UE 110 has locked onto a RAT while in service, but subsequently went into an OOS condition on the locked RAT. Therefore, the UE 110 may have locked onto a RAT that is not available (e.g., due to water attenuation or some other coverage reason). However, another RAT of the same network may be available that the UE is not capable of detecting or searching for due to the features of the RAT lock of the second activity mode according to the exemplary embodiments. To avoid disruption to the user, after the UE 110 goes to an OOS condition with the selected RAT or remains in an OOS condition after having locked onto a last camped RAT, the UE 110 may initiate the RUO timer. For illustrative purposes, the RUO timer may be two minutes. However, the RUO timer may be any duration that is shorter or longer than two minutes.

When the RUO timer has expired, the UE 110 may be configured to release the lock to the selected RAT. In this manner, the RAT lock may be released even though the activity has not been paused or ended. Through the release based on the RUO timer, the UE 110 may be provided an opportunity to scan all supported RATs and get back to normal service. However, since the RAT lock is released while the activity is still ongoing, the UE 110 may be re-locked to a RAT again to realize the power benefits of the second activity mode according to the exemplary embodiments. Thus, using the normal service (e.g., normal background MO traffic), the UE 110 may determine a RAT on which to use the RAT lock in a re-lock manner. Once re-locked to a RAT, the UE 110 may continue to monitor the OOS events and use the RUO timer accordingly to utilize the above operations.

The above mechanism may also be configured for scenarios where an available RAT is not found (e.g., normal service cannot be achieved on the available RATs) during the scan period after the RUO timer has expired. Initially, the scan period may also be associated with a timer or predetermined duration on which to scan the available RATs. Thus, if an available RAT is found that provides normal service, the UE 110 may identify this RAT to use the RAT lock. However, if an available RAT is not found during this scan period, the UE 110 may utilize a last known configuration, proceed to an emergency mode configuration, or a combination thereof. In a first example, with the last known configuration, upon expiry of the scan period, the UE 110 may revert to the last RAT on which the RAT lock was used. Since the OOS condition persists, the UE 110 may again initiate the RUO timer and continue using the above described operations. In a second example, with the emergency mode configuration, upon expiry of the scan period, the UE 110 may utilize the CMAS mode in a substantially similar manner described above for the first activity mode. In a third example, using a combination of the above examples, the UE 110 may revert to the last RAT on which the RAT lock was used for a predetermined number of times after which a further determination that there is no available RAT results in the CMAS mode being selected instead.

In a third example of using the RAT lock, when re-locking to a RAT, the UE 110 may use a biased approach or an unbiased approach. In the biased approach, the UE 110 may attempt to lock to a selected RAT if the UE 110 is in normal service on the selected RAT. For example, the selected RAT may be WCDMA. For illustrative purposes, the description herein relates to the biased approach using the WCDMA RAT. However, those skilled in the art will understand that the biased approach may use any RAT such as LTE. Under the biased approach, the UE 110 may bias the selection for the RAT lock based on performance thresholds. Thus, in selecting the RAT in the biased approach, the UE 110 may learn from previous in service and OOS experiences. Alternatively, the UE 110 may be preset based on coverage details of a carrier that the UE 110 is operating. In the unbiased approach, the UE 110 may lock to the first RAT that the UE recovers normal service. Therefore, the unbiased approach does not bias the UE 110 to a particular RAT. For example, the unbiased approach may be used when there is no prior knowledge of which RAT is to be used. Accordingly, the UE 110 may utilize a first in first out (FIFO) mechanism with the unbiased approach.

Using the above biased approach, there may be several use cases that arise. For illustrative purposes, the following use cases utilize the WCDMA as the biased RAT and may not utilize the CMAS mode. However, as described above, the CMAS mode may be used when the re-lock mechanism does not identify an available RAT and the UE 110 continues OOS. In a first use case, the UE 110 may not find the WCDMA RAT after the RUO timer expires and may remain unlocked or implicitly lock to another RAT (e.g., LTE). For example, the UE 110 may have normal service on the LTE RAT. Then the activity may begin so that the LTE RAT is selected for the RAT lock and the second activity mode is used. At a subsequent time, the UE 110 may go OOS or have limited service on LTE such that the RUO timer is initiated. On expiry of the RUO timer, the UE 110 may release the RAT lock and search for LTE and WCDMA service (since the WCDMA is the biased RAT). However, in the biased approach, re-locks are only used when the preset biased RAT is found. Thus, in a scenario where the UE 110 only finds the LTE RAT, the UE 110 may use an implicit lock or "soft" lock for LTE. The implicit lock may be a less strict lock than the RAT lock with additional factors that may allow for its release.

In a second use case, the UE 110 may find the WCDMA RAT after the RUO timer expires to therefore lock to this preset, biased RAT. For example, the UE 110 may have normal service on the LTE RAT. Then the activity may begin so that the LTE RAT is selected for the RAT lock and the second activity mode is used. At a subsequent time, the UE 110 may go OOS or have limited service on LTE such that the RUO timer is initiated. On expiry of the RUO timer, the UE 110 may release the RAT lock and search for LTE and WCDMA service. In a scenario where the UE 110 finds the WCDMA RAT and this is the biased RAT, the UE 110 may use the RAT lock for WCDMA.

In a third use case, the UE 110 may use a continuing sequence. For example, the UE 110 may have normal service on the WCDMA RAT. Then the activity may begin so that the WCDMA RAT is selected for the RAT lock and the second activity mode is used. At a subsequent time, the UE 110 may go OOS or have limited service on WCDMA such that the RUO timer is initiated. On expiry of the RUO timer, the UE 110 may release the RAT lock and search for LTE and WCDMA service. In a scenario where the UE 110 finds the LTE RAT, the UE 110 may use the implicit lock for LTE. At a further subsequent time, the UE 110 may again go OOS or have limited service on LTE such that a further RUO timer is initiated. On expiry of this further RUO timer, the UE 110 may release the RAT lock and search for LTE and WCDMA service. In a scenario where the UE finds the WCDMA RAT at this iteration, the UE 110 may use the RAT lock for WCDMA. The third use case may also incorporate the CMAS mode. For example, when continuous re-locks result in only implicit locks but also continuous OOS events triggering the RUO timer, after a predetermined number of times that this process is used, the UE 110 may proceed with the CMAS mode.

Using the above unbiased approach, there may be several use cases that arise. For illustrative purposes, the following use cases may not utilize the CMAS mode. However, as described above, the CMAS mode may be used when the re-lock mechanism does not identify an available RAT and the UE 110 continues OOS. In a first use case, the UE 110 may find the LTE RAT after the RUO timer expires and locks to the LTE RAT. For example, the UE 110 may have normal service on the LTE RAT. Then the activity may begin so that the LTE RAT is selected for the RAT lock and the second activity mode is used. At a subsequent time, the UE 110 may go OOS or have limited service on LTE such that the RUO timer is initiated. On expiry of the RUO timer, the UE 110 may release the RAT lock and search for LTE and WCDMA service. With no bias, based on the RAT that the UE 110 finds, the UE 110 may use the RAT lock for this RAT (e.g., the LTE RAT). The first use case may also apply to the WCDMA RAT.

In a second use case, the UE 110 may use a continuing sequence. For example, the UE 110 may have normal service on the WCDMA RAT. Then the activity may begin so that the WCDMA RAT is selected for the RAT lock and the second activity mode is used. At a subsequent time, the UE 110 may go OOS or have limited service on WCDMA such that the RUO timer is initiated. On expiry of the RUO timer, the UE 110 may release the RAT lock and search for LTE and WCDMA service. In a scenario where the UE 110 finds the LTE RAT, the UE 110 may use the RAT lock on the LTE RAT. At a further subsequent time, the UE 110 may again go OOS or have limited service on LTE such that a further RUO timer is initiated. On expiry of this further RUO timer, the UE 110 may release the RAT lock and search for LTE and WCDMA service. In a scenario where the UE finds the WCDMA RAT at this iteration, the UE 110 may use the RAT lock for WCDMA. The second use case may also incorporate the CMAS mode. For example, when continuous re-locks do not result in either the LTE or WCDMA RAT being available, the UE 110 may proceed with the CMAS mode (or use a last RAT lock configuration).

In a fourth example of using the RAT lock, the RAT lock may be released whenever a predetermined event is registered. For example, as noted above, whenever the UE 110 goes OOS or is in limited service for more than the RUO timer (e.g., two minutes), the UE 110 may release the RAT lock. In another example, the UE 110 may release the RAT lock whenever the UE 110 is locked to the LTE RAT but an IMS de-registration event occurs. To re-register with the IMS, the RAT lock may be released. Those skilled in the art will understand that the IMS de-registration event may occur when there is a server error, when the UE 110 entered and subsequently exited the CMAS mode (e.g., since the UE 110 is no longer IMS registered due to the CMAS mode), an emergency call is attempted, etc.

In a fifth example of using the RAT lock, throughout the second activity mode, there may be an overriding operation that is performed when certain criteria are met regardless of the state of the UE 110 and process along the second activity mode based on the above description. For example, when the UE 110 determines that the activity has ended, the above noted operations may be terminated as the second activity mode is no longer required and normal operations may be resumed. In a further example, when the UE 110 determines that an emergency call is performed, the above noted operations may be terminated as the second activity mode is again not required and normal operations to establish and perform the emergency call may be used.

As noted above, the RAT lock may be an exemplary type of network lock that is used by the second activity mode according to the exemplary embodiments. However, the RAT lock is only exemplary and the exemplary embodiments may be modified to use a network lock at a different level to achieve similar features to power compensation and network operation use. A first example of an alternative lock may be a cell lock. The cell lock may lock the UE 110 to service in a specific set of one or more cells in a given RAT. The cell lock may therefore prevent excessive (re)selections and/or searches from being performed, thereby saving power. A second example of an alternative lock may be a frequency lock. The frequency lock may lock the UE 110 to service in a specific set of one or more frequencies, bands, channels, etc. in a given RAT. The frequency lock may therefore allow the UE 110 to select frequencies based on current system information blocks (SIBs) (e.g., which bands are neighbors), attenuation profiles (e.g., 700 MHz band may have a better attenuation profile as compared to 2.1 GHz band), etc. Those skilled in the art will understand that the network lock may also encompass other types of locks.

Figure 4:
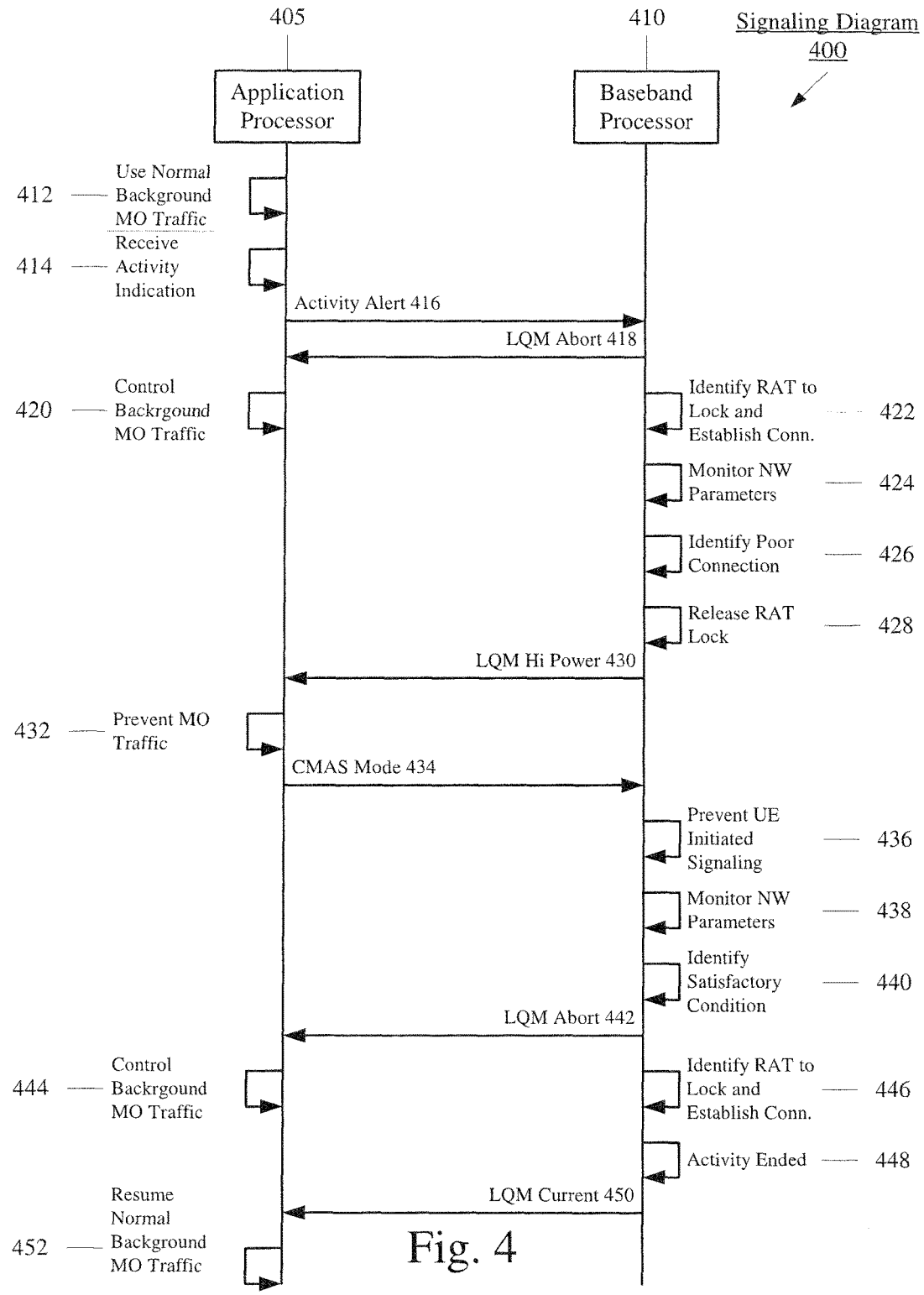
FIG. 4 shows an example second signaling diagram of utilizing a second activity mode according to various exemplary embodiments described herein.

FIG. 4 shows an example second signaling diagram 400 of utilizing the second activity mode according to the various exemplary embodiments described herein. The signaling diagram 400 may relate to a set of operations performed to identify an activity status of the user of the UE 110 such that a network lock of the second activity mode may be used. The signaling diagram 400 relates to operations performed by an applications processor 405 and a baseband processor 410 of the UE 110. Again, the processor 205 may represent both a baseband processor and an applications processor. The second signaling diagram 400 also relates to a particular scenario in which select operations are used. As noted above, the second activity mode may utilize a range of operations based on the conditions being experienced on the UE 110 and/or based on predetermined/preset factors of using the network lock of the second activity mode. Thus, the second signaling diagram 400 may illustrate only a subset of the possible operations of the second activity mode.

Initially, the application processor 405 may use a setting 412 for normal background mobile originating traffic. Again, the normal background mobile originating traffic may entail the UE 110 being configured to receive data and transmit all data, both user initiated and background, whether critical or non-critical. At a subsequent time, the application processor 405 may receive an indication 414 that an activity is to be started. As described above, the UE 110 may include an activity application (e.g., run by the application processor 405) that receives a manual input of an intent of the user of the UE 110 to perform an activity. The signal diagram 400 is described with regard to the manual input on the activity application indicating the activity intent. Thus, the application processor 405 provides an activity alert 416 to the baseband processor 410.

When the baseband processor 410 receives the activity alert 416, the baseband processor 410 may determine the LQM. At this instance, the activity alert 416 may refer to an intention to perform an activity with no indication as to whether the activity is being performed. However, in contrast to the first activity mode, the second activity mode may initiate operations to select and use a network lock once the activity has been indicated as being intended or as being performed. The second activity mode may use the intermediary setting while the network lock feature is being used and only resort to the restricted setting of the CMAS mode when conditions become unfavorable to retain use of the network lock. Thus, the baseband processor 410 may provide the LQM abort 418 to the application processor 405 for the intermediary setting to be used. When the application processor 405 receives the LQM abort 418, the application processor 405 may still enable incoming data to be received and processed but limit the types of mobile originating traffic by exerting a control 420 on the background and non-critical mobile originating traffic. Again, the control 420 may still allow user initiated mobile originating traffic. Thus, while the network lock is to be used, user initiated mobile originating traffic may still be permitted.

After providing the LQM abort 418, the baseband processor 410 may perform the operations to select and use the network lock. For illustrative purposes, the network lock is described with regard to a RAT lock. However, it is again noted that the network lock may also be a cell lock, a frequency lock, etc. Thus, the baseband processor 410 may identify 422 a RAT to lock and perform connection attempts based on the criteria described above. In the exemplary embodiment being described for the second signaling diagram 400, it may be assumed that the UE 110 was in service and a RAT providing normal service is determined for selection of the RAT lock (in contrast to selecting a last camped RAT when the UE 110 is OOS).

At a subsequent time, the baseband processor 410 may monitor 424 the network parameters associated with the selected RAT and the connection or connection attempts. As described above, when the network parameters indicate that the service on the selected RAT decreases below an acceptable threshold, the baseband processor 410 may allow additional power consumption to provide a minimum amount of service. The signal diagram 400 illustrates when such a scenario is detected. Thus, the baseband processor 410 identifies 426 the poor connection with the selected RAT used in the RAT lock. The baseband processor 410 releases 428 the RAT lock. When the RAT lock is released, the baseband processor 410 may provide an indication 430 of the LQM high power. However, as noted above, the use of the LQM high power is only exemplary. The signal diagram 400 may be modified to incorporate operations in which the balancing feature is used instead of the emergency mode (corresponding to the LQM high power setting). In the exemplary embodiment described for the second signaling diagram 400, it may be assumed that the CMAS mode is selected when the poor connection is identified rather than using operations to re-lock the UE 110 to the same or different RAT. However, as noted above, a set of operations to re-lock the UE 110 using a biased or unbiased approach may be used instead of using the CMAS mode.

When the application processor 405 receives the indication 430 for the LQM high power, the application processor 405 may prevent 432 mobile originating traffic. Again, the control may be further restricted such that even user initiated mobile originating traffic is not allowed. Upon this control being set, the application processor 405 may provide an indication 434 for a CMAS mode to the baseband processor 410. When the baseband processor 410 has received the indication 434 for the CMAS mode, the baseband processor 410 may prevent UE initiated signaling to coincide with the control of the application processor 405 for mobile originating traffic. It is again noted that the baseband processor 410 may also filter incoming traffic such that only emergency related data is processed. Thus, if an emergency ping or message is received, the application processor 405 and the baseband processor 410 may exit out of the CMAS mode of the activity mode and revert to a connected mode such that the emergency data may be properly handled (e.g., exchange data with a network to establish a connection for an emergency call).

At a subsequent time, the baseband processor 410 may monitor 438 the network parameters. When the network parameters have been monitored and maintained an acceptable performance to provide a sufficient service to the user, the network lock may again be used and the CMAS mode may be exited. Thus, the baseband processor 410 may identify 440 satisfactory conditions. Accordingly, the baseband processor 410 may provide an indication 442 of the LQM abort to exit the CMAS mode. When the application processor 405 receives the indication 442 of the LQM abort, the application processor 405 may return to using a control 444 for background mobile originating traffic. Again, upon providing the indication 442 of the LQM abort, the baseband processor 410 may identify the RAT to lock and perform connection attempts to the selected RAT of the RAT lock.

At a subsequent time, the baseband processor 410 may detect 448 that the activity has ended. When the activity has ended, the baseband processor 410 may provide an indication 450 for the LQM current corresponding to use of a connected mode where all traffic is permitted. When the application processor 405 receives the indication 450 of the LQM current, the application processor 405 may resume normal background mobile originating traffic.

According to a third activity mode, the mode engine 245 may place the UE 110 in the high power setting based on the activity status. When the activity status indicates that the activity is intended to be performed or is being performed, the third activity mode may include an immediate use of an emergency setting of the third activity mode. That is, the third activity mode directly utilizes the CMAS mode while the activity is being performed.

In the immediate use of the CMAS mode, the third activity mode aims to block mobile originating and mobile terminating data such that only emergency related data is processed. In this manner, signaling traffic may be significantly cut down by entering the CMAS mode when the activity is started (or intended to be started). Again, the CMAS mode may be used for incoming emergency related data to be processed. The CMAS mode may also enable mobile originating emergency operations to be performed and corresponding data to be transmitted. In the third activity mode, the CMAS mode may be exited only after the activity has ended (or an emergency network session is being used).

In the scenario where the CMAS mode is exited due to an emergency network session being used, the third activity mode may allow the UE 110 to remain out of the CMAS mode for a regulatory defined time duration. As those skilled in the art will understand, the emergency network session may entail the user of the UE 110 placing an emergency call to the appropriate emergency center. The emergency network session may also entail the emergency center possibly reaching out to the user of the UE 110. Thus, the time duration may allow for this call back feature. It is noted that when the CMAS mode is exited due to an emergency network session being used, the third activity mode may simply remain out of the CMAS mode or may also return to the CMAS mode when the emergency network session has ended (upon a determination that the activity is being performed). Thus, in such a scenario, the CMAS mode may only be paused during the emergency network session and exited when the activity has ended.

Figure 5:
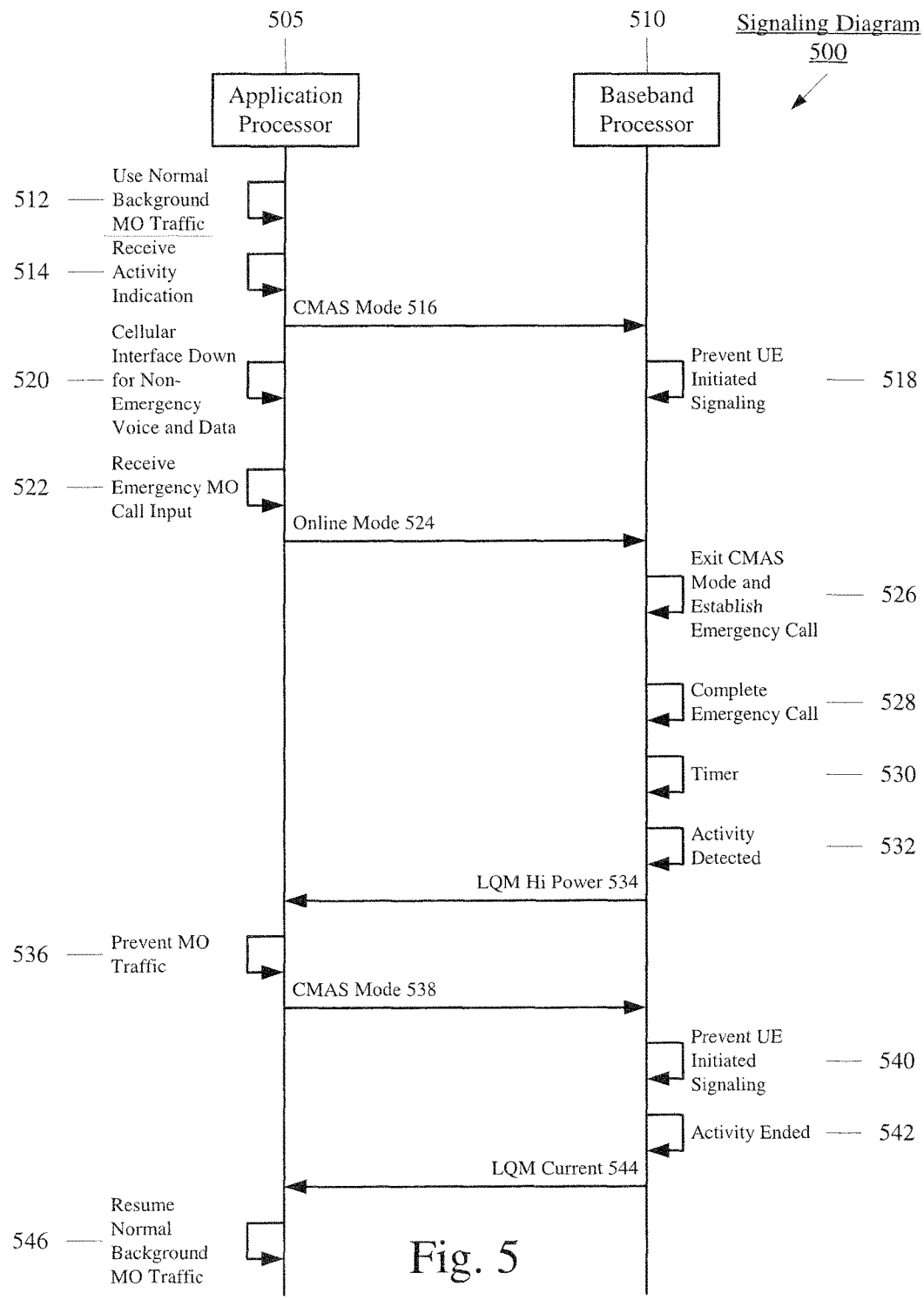
FIG. 5 shows an example third signaling diagram of utilizing a third activity mode according to various exemplary embodiments described herein.

FIG. 5 shows an example third signaling diagram 500 of utilizing the third activity mode according to the various exemplary embodiments described herein. The signaling diagram 500 may relate to a set of operations performed to identify an activity status of the user of the UE 110 such that an emergency setting of the third activity mode may be used. The signaling diagram 500 relates to operations performed by an applications processor 505 and a baseband processor 510 of the UE 110. Again, the processor 205 may represent both a baseband processor and an applications processor.

Initially, the application processor 505 may use a setting 512 for normal background mobile originating traffic. Again, the normal background mobile originating traffic may entail the UE 110 being configured to receive data and transmit all data, both user initiated and background, whether critical or non-critical. At a subsequent time, the application processor 505 may receive an indication 514 that an activity is to be started. As described above, the UE 110 may include an activity application (e.g., run by the application processor 505) that receives a manual input of an intent of the user of the UE 110 to perform an activity. The signal diagram 500 is described with regard to the manual input on the activity application indicating the activity intent.

Based on the activity indication 514, the application processor 505 may provide an indication 516 for the CMAS mode to the baseband processor 510. When the baseband processor 510 has received the indication 516 for the CMAS mode, the baseband processor 510 may prevent 518 UE initiated signaling that is not related to an emergency. It is noted that the baseband processor 510 may also filter incoming traffic such that only emergency related data is processed. Thus, if an emergency ping or message is received, the application processor 505 and the baseband processor 510 may exit out of the CMAS mode and revert to a connected mode such that the emergency data may be properly handled (e.g., exchange data with a network to establish a connection for an emergency call). With the indication 516 for the CMAS mode being provided to the baseband processor 510, the application processor 505 may perform 520 a cellular interface shut down for non-emergency voice and data.

The signal diagram 500 illustrates the scenario where the CMAS mode is exited due to a mobile originating emergency call being performed by the user. Thus, at a subsequent time, the application processor 505 may receive 522 an emergency mobile originating call input. The application processor 505 may provide an indication 524 for the online mode to the baseband processor 510. When the baseband processor 510 has received the indication 524 for the online mode, the baseband processor 510 may exit 526 the CMAS mode and enter the online mode for the emergency call to be established. However, it is again noted that the CMAS mode may be exited upon the activity ending. The activity ending may be determined using any of the above identified mechanisms (e.g., receiving a manual input, detecting the appropriate network parameters all satisfying a respective threshold, etc.).

As described above, the UE 110 may also be configured to return to the CMAS mode when the activity is again determined to be performed after the emergency call has completed. Thus, the baseband processor 510 may identify when the emergency call is complete 528. Upon completion of the mobile originating emergency call, the baseband processor 510 may initiate a timer. As noted above, this timer may enable the online mode to continue to be used for a return call or contact attempt to be processed from the emergency center. Once the timer expires, a manual input of the activity being performed or an automatic determination that the activity is being performed may be used to detect 532 the activity. The third activity mode may therefore utilize substantially similar operations in using the high power setting as the first or second activity mode by the baseband processor 510 providing an indication 534 of the LQM high power to the application processor 505. The application processor 505 may prevent 536 mobile originating traffic. The application processor 505 may also provide an indication 538 for the CMAS mode. Accordingly, when the baseband processor 510 has received the indication 538 for the CMAS mode, the baseband processor 510 may prevent 540 UE initiated signaling to coincide with the control of the application processor 505 for mobile originating traffic. At a subsequent time, the baseband processor 510 may detect 542 that the activity has ended. With the activity having ended and no more need for the activity mode, the baseband processor 510 may provide an indication 544 for a LQM current. Thus, when the application processor 505 has received the indication 544 for the LQM current, the application processor 505 may return to using a setting 546 for normal background mobile originating traffic in which all mobile originating traffic including non-critical and background traffic is allowed.

It is noted that the mode engine 245 may be configured with one, two, or all three of the above described activity modes. When a plurality of the activity modes is available, the mode engine 245 may determine which of the activity modes to use based on a variety of different factors. For example, when the first activity mode and the third activity mode are available, the mode engine 245 may determine whether an instantaneous network metric measurement (e.g., a current RSSI value) is at least a predetermined threshold. When above the threshold, the first activity mode may be available for use. When below the threshold, the third activity mode may only be available for use. In another example, when all three activity modes are available, the mode engine 245 may determine whether an amount of a power supply of the UE 110 is at least a first predetermined threshold. When above the first predetermined threshold, the all three activity modes may be available. When below the first predetermined threshold, the mode engine 245 may determine whether the amount of the power supply of the UE 110 is at least a second predetermined threshold. When below the first predetermined threshold but above the second predetermined threshold, the second and third activity modes may be available. When below the second predetermined threshold, only the third activity mode may be available. It is also noted that when a plurality of the activity modes is available, the mode engine 245 may dynamically select the proper activity mode to use (e.g., based on an instantaneous measurement at the time the determination is to be made).

The exemplary embodiments are described to provide mitigation features for power consumption and network operation use through the first, second, and third activity modes. The exemplary embodiments may also incorporate further mitigation features to further enable power conservation and reduce network operations. In a first example, the exemplary embodiments may utilize observations while in the activity mode. The observations may indicate that the UE 110 may have better service by staying on a serving cell rather than starting an aggressive search (e.g., for momentary OOS/loss of service cell), measurements and (re)selections. By utilizing the observations, the exemplary embodiments may contain the factors that lead to frequent ping pongs and higher power consumption.

In a second example, the exemplary embodiments may extend a reselection timer for RAT neighbor cells. The reselection timer may be started when the serving cell is below a predetermined performance threshold while a neighbor cell is above the predetermined performance threshold. In this scenario when the serving and neighbor cells are fluctuating, the conventional reselection timer may result in an impulsive decision by the UE 110 to reselect to a different system. However, by extending the reselection timer, the exemplary embodiments may reduce the number of RAT (re)selections.

In a third example, the exemplary embodiments may extend a time to trigger (TTT). The TTT may be used in connected mode to trigger measurement events (e.g., B1 and B2 in LTE or 3A and 3B in WCMDA) that cause a network to handover the UE to another system. Extending the TTT to a value larger than a conventional duration may result in less impulsive handovers and handover failures.

In a fourth example, the exemplary embodiments may be configured to avoid panic searches. As those skilled in the art will understand, panic searches may be triggered when the serving cell signal goes below a predetermined threshold. Panic searches may result in higher power consumption. Thus, the exemplary embodiments may avoid panic searches by reducing the predetermined threshold corresponding to the serving cell signal to start a panic search when the device is in the activity mode, thereby discouraging frequent panic searches.

In a fifth example, the exemplary embodiments may request a higher idle mode DRX duration from the network while in the activity mode. Accordingly, for a tracking area update (for LTE) and a routing area update (for non-LTE networks), measurement intervals may be reduced to also reduce hasty re-selections. For example, the DRX paging cycle may be network configured to 1.28 seconds. The DRX measurements may instead be requested to be performed by a multiple of this cycle (e.g., 2.56 seconds, 5.12 seconds, etc.). In the scenario where the network is not configured to adjust the DRX paging cycle, the UE 110 may implicitly perform this feature by skipping the appropriate measurements corresponding to the higher idle mode DRX duration (e.g., for 2.56 second DRX measurements, skip every other cycle).

In a sixth example, the exemplary embodiments may reduce baseband processor and application processor discretionary activities. For example, the discretionary activities may include cell harvesting, cell information, etc. that is not essential, particularly when the UE 110 is in the activity mode. Thus, the exemplary embodiments may reduce or eliminate operations that are used merely to build databases/tables or any other superfluous activity that is not integral to the operations being performed on the UE 110 during the activity state.

In a seventh example, the exemplary embodiments may reduce or block uplink traffic if the baseband is in a weak channel condition and when the activity is being performed. For example, the application processor may classify data as background or foreground packets and the baseband processor may block background packets when conditions are not suitable for transmitting background packets. The application processor may also whitelist applications whose data is allowed during the activity mode while remaining applications may be dropped by the baseband processor. If a link quality metric indicates a high power mode, then the baseband processor may reduce a number of retransmissions in the data plane to reduce a power cost due to retransmissions at various layers in the protocol stack (e.g., via RLC and MAC). The baseband processor may also assert flow control to the application processor as a means to stop uplink data transfer until channel conditions improve or the activity ends.

Figure 6:
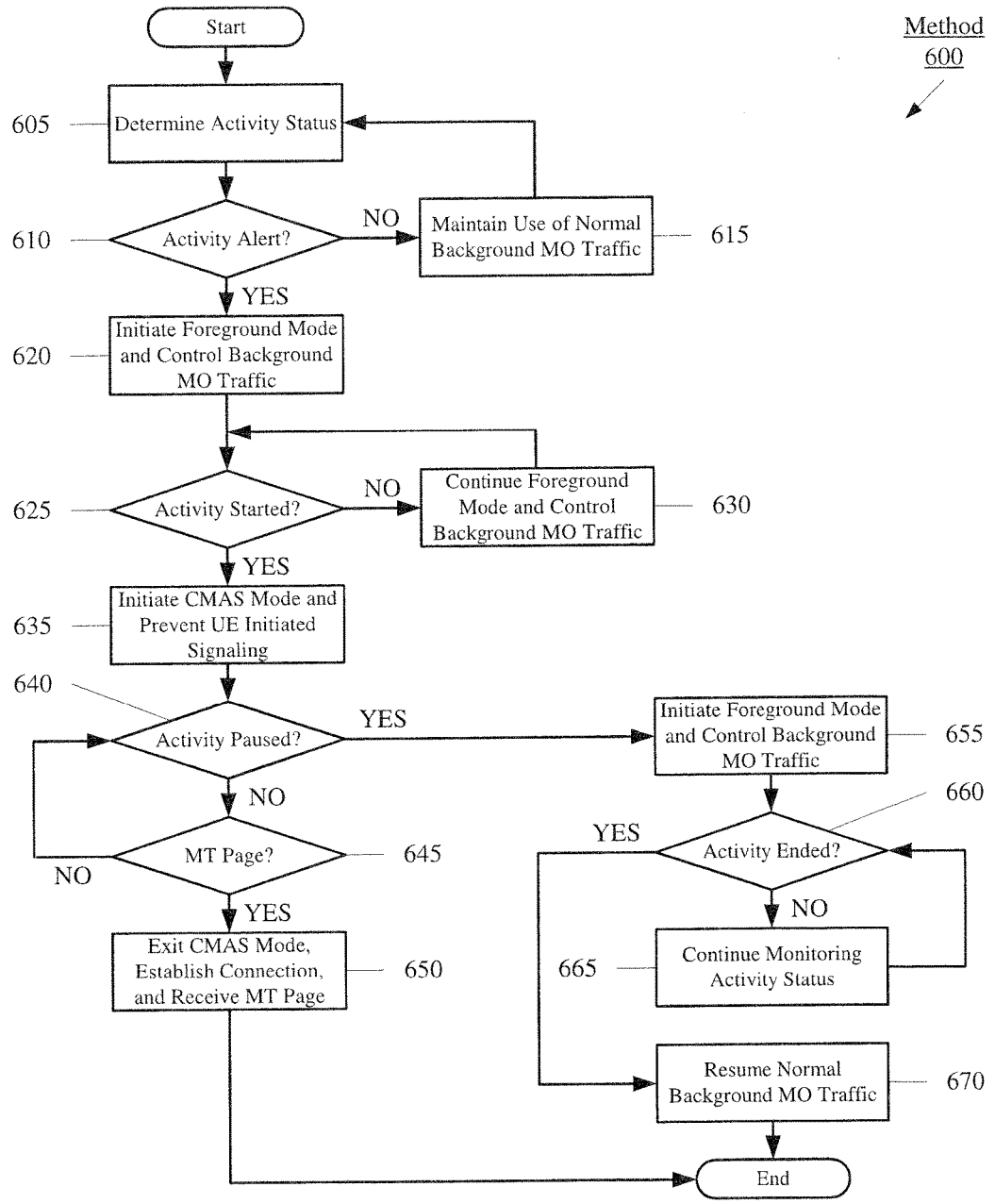
FIG. 6 shows an example method for utilizing a first activity mode according to various exemplary embodiments described herein.

FIG. 6 shows an example method 600 for utilizing a first activity mode according to the various exemplary embodiments described herein. The first activity mode may utilize the activity status to determine the setting to be used on the UE 110 for the first activity mode including a normal mode, a foreground mode, and a CMAS mode. The method 600 may be performed by the status engine 235, the monitoring engine 240, and the mode engine 245. The method 600 will be described with regard to the network arrangement 100 of FIG. 1 and the UE 110 of FIG. 2.

In 605, the UE 110 may determine an activity status. As described above, the activity status may be determined using a manual approach, an automated approach, or a combination thereof. In the manual approach, the UE 110 may include an activity application in which the user may provide manual input indicating whether the activity is intended to begin, the activity is being performed, the activity has been paused, or the activity has ended. In the automated approach, the UE 110 may utilize any available information from any component of the UE 110. For example, using the transceiver 225 and tracking events associated with network connection attempts, the UE 110 may determine the activity status based on network metric measurements. In another example, the UE 110 may include motion co-processors, sensors, etc. that provide other information used in determining the activity status.

In 610, the UE 110 determines whether there is an activity alert. The UE 110 may determine if the user has changed from a non-activity state to an activity state where the activity state may be an intention to begin performing the activity or that the activity has been started. Assuming in 605 that the user is in the non-activity state and if the user remains in the non-activity state, the UE 110 continues to 615 where the normal mode for background mobile originating traffic is maintained. That is, all mobile originating traffic including non-critical and background data may be allowed and all mobile terminating traffic may be allowed. The UE 110 may then return to 605 to continue monitoring the activity status.

If the UE 110 determines that there is an activity alert and the user has changed from the non-activity state to the activity state, in 620, the UE 110 initiates a foreground mode. In the foreground mode, the UE 110 may control the background and non-critical mobile originating traffic. While maintaining all mobile terminating traffic and allowing all user initiated mobile originating traffic, the UE 110 may prevent background and non-critical mobile originating traffic. It is noted that, as described above, the baseband processor and the application processor may utilize the LQM in updating the settings to be used. For example, a change from the non-activity state to the activity state may entail an alert being provided from the application processor to the baseband processor which then entails the baseband processor providing an LQM abort to the application processor.

In 625, the UE 110 determines whether the activity has started or that the user is performing the activity. As noted above, the activity status including the start/performing of the activity may be determined using the manners described in 605. If the activity has not yet started, the UE 110 continues to 630. In 630, the UE 110 continues using the foreground mode. If the UE 110 determines that the activity has started, in 635, the UE 110 initiates a CMAS mode. In the CMAS mode, a restricted setting is used where all mobile originating traffic is prevented and all mobile terminating traffic is filtered such that only emergency data is processed. Again, with regard to the signaling between the baseband processor and the application processor, the baseband processor may provide a LQM high power to the application processor.

In 640, the UE 110 determines whether the activity has paused. Again, the UE 110 may determine this activity status using the above noted mechanisms. If the activity has not been paused (or ended), the UE 110 continues to 645. In 645, the UE 110 determines if a mobile terminating emergency page has been received. If no emergency page is received, the UE 110 returns to 640 to continue monitoring whether the activity has been paused. However, if an emergency page has been received, the UE 110 continues to 650. In 650, the UE 110 exits the CMAS mode, enters connected mode to establish a connection to receive the page and/or perform any other operation associated with the emergency data that was received. As illustrated, by exiting the CMAS mode and entering the connected mode, the UE 110 may end use of the activity mode. However, it is noted that the method 600 may be modified to return to 640 from 650 by re-entering the CMAS mode if the activity is continuing.

Returning to 640, if the activity has been paused, in 655, the UE 110 again initiates the foreground mode and allows all mobile terminating traffic as well as user initiated mobile originating traffic but prevents only background and non-critical mobile originating traffic. In 660, the UE 110 determines whether the activity has ended. If the activity has not ended, in 665, the activity status from the activity being paused continues to be monitored. If the activity has ended, in 670, the UE 110 returns to using the normal mode in which all traffic is allowed.

It is noted that the method 600 may include the above described timers. For example, whenever the CMAS mode has been exited, the method 600 may include operations to begin a guard timer and determine whether the use of the CMAS mode is still allowed (e.g., if the guard timer is still running). The method 600 may also include operations to begin a backoff timer after the guard timer has expired to prevent the CMAS mode from being re-entered until expiry of the backoff timer.

Figure 7:
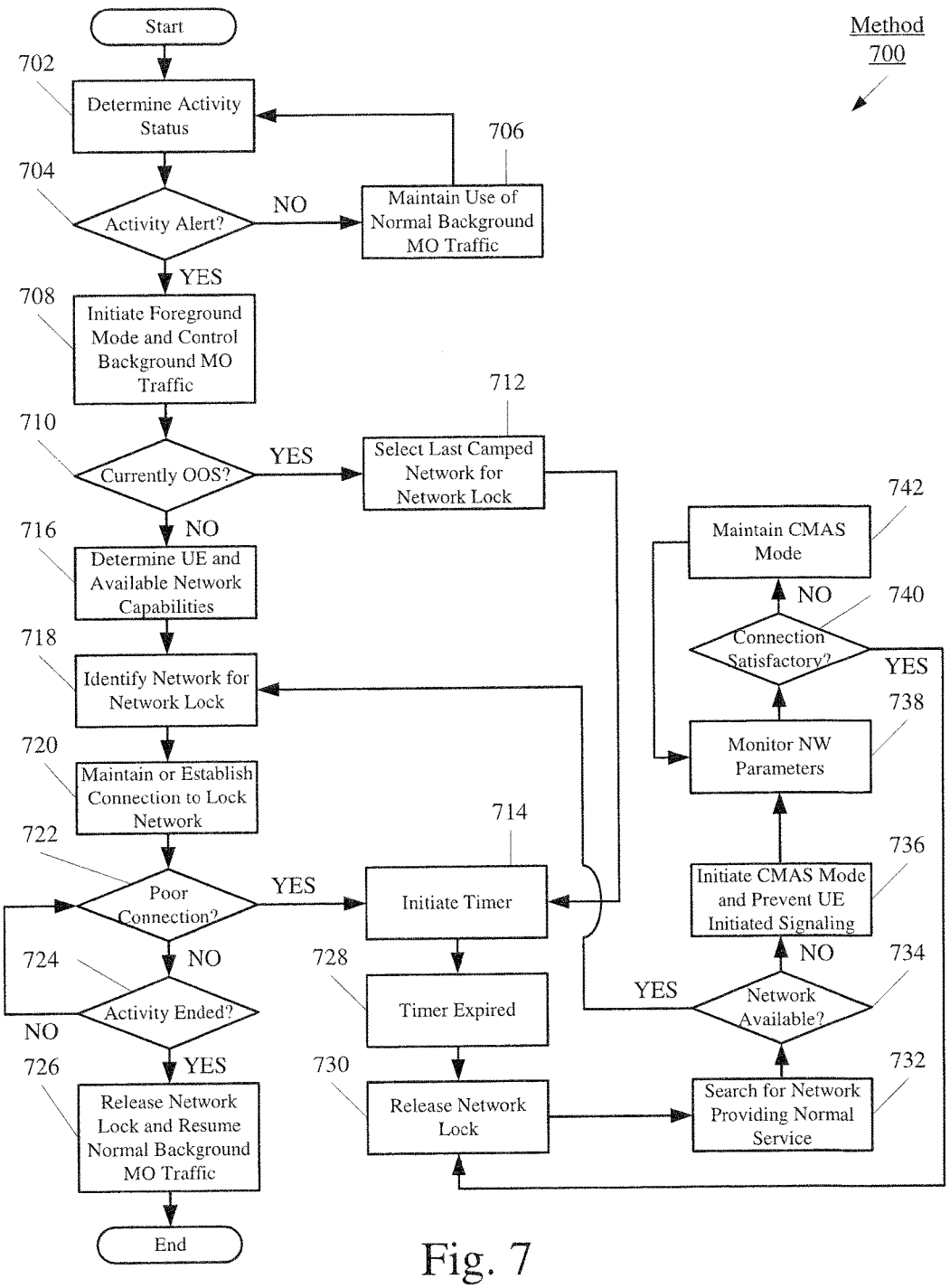
FIG. 7 shows an example method for utilizing a second activity mode according to various exemplary embodiments described herein.

FIG. 7 shows an example method 700 for utilizing a second activity mode according to the various exemplary embodiments described herein. The second activity mode may utilize the activity status to identify a network characteristic (e.g., RAT, cell, or frequency) upon which to lock. The method 700 may be performed by the status engine 235, the monitoring engine 240, and the mode engine 245. The method 600 will be described with regard to the network arrangement 100 of FIG. 1 and the UE 110 of FIG. 2.

In 702, the UE 110 may determine an activity status in a substantially similar manner as described above for 605 in the method 600. In 704, the UE 110 determines whether there is an activity alert in a substantially similar manner as described above for 610 in the method 600. Assuming in 704 that the user is in the non-activity state and if the user remains in the non-activity state, the UE 110 continues to 706 where the normal mode for background mobile originating traffic is maintained in a substantially similar manner as described above for 615 in the method 600. If the UE 110 determines that there is an activity alert and the user has changed from the non-activity state to the activity state, in 708, the UE 110 initiates a foreground mode in a substantially similar manner as described above in 620 in the method 600.

In 710, the UE 110 determines whether the UE 110 is currently in service or OOS. For any of the reasons such as those noted above, the UE 110 may not be in service with a network. Thus, operations such as scanning for networks may have a null result. When the UE 110 is OOS, in 712, the UE 110 selects a last camped network in which to use a network lock. Again, by being OOS with the network, the UE 110 may not be capable of determining other available networks on which to use the network lock. Subsequently in 714, the UE 110 initiates a timer (e.g., a RUO timer lasting two minutes).

If the UE 110 is in service, the UE 110 continues from 710 to 716. In 716, the UE 110 determines capabilities of the UE 110 and the available networks. This operation illustrates one of the further mitigation features that may be used for the first, second, and third activity modes. For example, the capabilities of the UE 110 may include voice and data related functionalities and the capabilities of the available networks may include whether or not there is support for the voice and data related functionalities capable of being provided to the UE 110. In this manner, the UE 110 may utilize a first criteria to, in 718, identify a network in which to lock (e.g., an optimal network). As described above, the UE 110 may also select a currently connected network (e.g., RAT, cell, or frequency), use an evaluation period, use a static configuration table, or use a report from crowd-sourced information. When the details of the network lock have been determined, in 720, the UE 110 maintains a connection to a currently camped network (if determined that this network is selected) or establishes/attempts to establish a connection to the selected network in which the network lock is assigned (if different from a currently camped network).

In 722, the UE 110 determines whether the network in which the network lock is assigned provides a poor connection or otherwise poor conditions (e.g., limited service). The poor conditions may include, for example, a number of OOS events, RLFs, etc. beyond a predetermined acceptable threshold. If the network in which the network lock is assigned provides an acceptable level of service, the UE 110 continues to 724 in which a determination is made whether the activity has ended in a substantially similar manner as 660 in the method 600. As noted above, the intermediary setting of the LQM abort may be utilized so long as the network lock feature is being used. If the activity has not ended, the UE 110 returns to 722 to continue monitoring the selected network in which the network lock is assigned. However, if the activity has ended, in 726, the UE 110 releases the network lock and resumes the normal mode in a substantially similar manner as 670 in the method 600.

Returning to 722, if the network in which the network lock is assigned provides a poor connection or poor conditions, the UE 110 continues to 714 where the timer is initiated. In 728, at a subsequent time, the timer may have expired. Accordingly, in 730, the UE 110 may release the network lock. As noted above, the release of the network lock despite the activity continuing may provide the UE 110 with an opportunity to return the UE 110 to normal service (e.g., by finding a network that provides normal service using unimpeded operations). In 732, the UE 110 may search for networks providing this normal service. In 734, the UE 110 determines if any network is available that provides normal service. If no network is found, in 736, the poor conditions may trigger use of the restricted setting of the LQM high power such that the CMAS mode is initiated in a substantially similar manner as 635 in the method 600. However, it is noted that, as described above, the UE 110 may continue use do the foreground mode without the limitations imposed by the network lock to increase a service quality. In 738, the UE 110 monitors the network parameters to determine whether there is an available network in which to assign the network lock. In 740, the UE 110 determines whether the connection has become satisfactory where a network provides normal service. If no network is available, the UE 110 continues to 742 where the CMAS mode is maintained and the UE 110 returns to 738. However, if there is a network, the UE 110 returns to returns to 730. Returning to 734, if a network provides normal service and a re-lock is to be used on this network, the UE 110 returns to 718.

As noted above, the second activity mode may include further operations that may be incorporated throughout the method 700. For example, throughout the method 700, if an emergency call is performed on the UE 110 at any time, the method 700 may proceed along a different set of operations where the network lock is released (if the network lock has been used), normal operations are resumed, and the emergency call is established (or attempted to be established). In another example, while the timer is running or at any time between 728 to 744, if the activity ends, the method 700 may immediately continue to 726.

Figure 8:
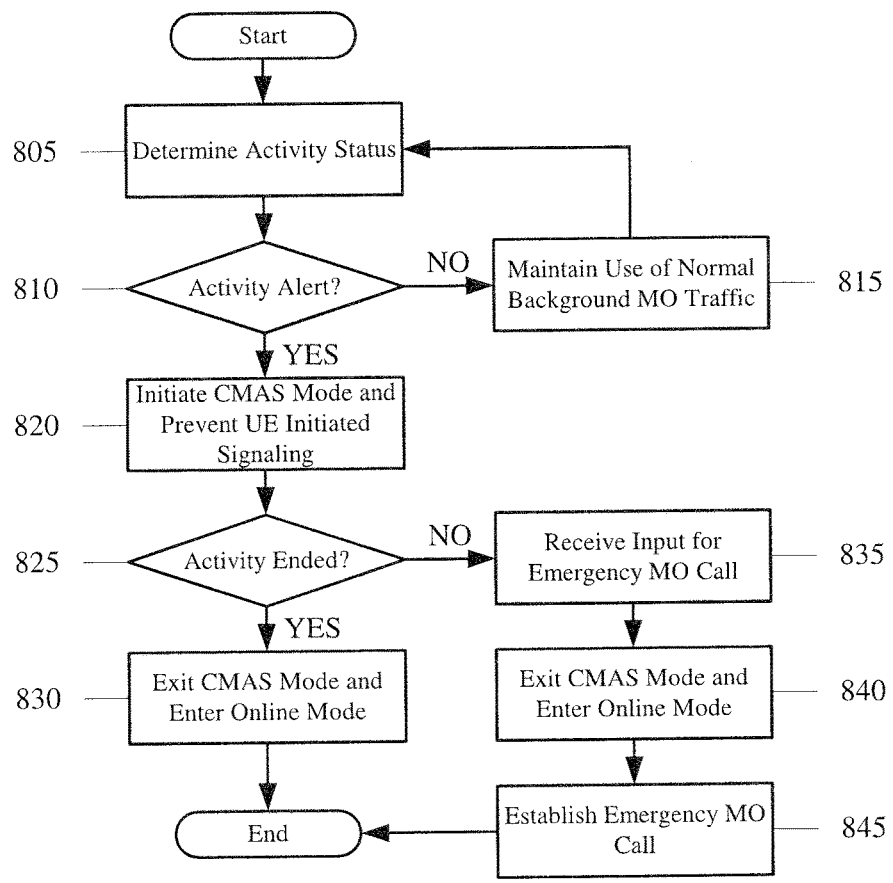
FIG. 8 shows an example method for utilizing a third activity mode according to various exemplary embodiments described herein.

FIG. 8 shows an example method 800 for utilizing a third activity mode according to the various exemplary embodiments described herein. The third activity mode may utilize the activity status to proceed to a CMAS mode. The method 800 may be performed by the status engine 235, the monitoring engine 240, and the mode engine 245. The method 600 will be described with regard to the network arrangement 100 of FIG. 1 and the UE 110 of FIG. 2.

In 805, the UE 110 may determine an activity status in a substantially similar manner as described above for 605 in the method 600. In 810, the UE 110 determines whether there is an activity alert in a substantially similar manner as described above for 610 in the method 600. Assuming in 805 that the user is in the non-activity state and if the user remains in the non-activity state, the UE 110 continues to 815 where the normal mode for background mobile originating traffic is maintained in a substantially similar manner as described above for 615 in the method 600. If the UE 110 determines that there is an activity alert and the user has changed from the non-activity state to the activity state, in 820, the UE 110 initiates a CMAS mode in a substantially similar manner as described above in 635 in the method 600. As described above, the third activity mode may only use the CMAS mode. Thus, any indication of the activity status being related to performing the activity, the UE 110 may be placed in the CMAS mode.

In 825, the UE 110 determines whether the activity has ended in a substantially similar manner as 660 in the method 600. If the activity has ended, in 830, the UE 110 exits the CMAS mode and enters an online mode in a substantially similar manner as 670 in the method 600.

If the activity has not ended, in 835, the UE 110 may receive an input for an emergency mobile originating call. As noted above, the CMAS mode may prevent UE initiated signaling. However, the CMAS mode may still retain a capability for the user to place emergency calls or use emergency services. Thus, the user may provide this emergency input. Upon receiving the emergency input, in 840, the UE 110 exits the CMAS mode and enters the online mode in a substantially similar manner as 830. In 845, the emergency mobile originating call is established and performed. Thereafter, there may be an assumption that the activity ends or the activity mode is no longer required. However, as noted above, the method 800 may be modified such that upon completion of the emergency mobile originating call, the method 800 returns to 820. It is also noted that the method 800 may include a timer feature in which after the emergency mobile originating call has been completed, the UE 110 remains in the online mode to receive any mobile terminating emergency calls.

The exemplary embodiments provide a device, system, and method of utilizing an activity mode when a user equipment is with a user (e.g., worn or held) and the user is participating in an activity. While performing the activity, signal fluctuations and otherwise relatively poor network related connection conditions may exist such that the user equipment may be subject to increased power consumption in performing additional network operations. Accordingly, the user equipment may use the activity mode to determine an activity status and utilize mitigation features that decrease the number of network operations that are being performed during this activity state to further decrease power consumption.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made to the present disclosure, without departing from the spirit or the scope of the exemplary embodiments. Thus, it is intended that the present disclosure cover modifications and variations of the exemplary embodiments invention provided they come within the scope of the appended claims and their equivalent.

What is claimed is:

1. A method, comprising:
   at a device that is configured to establish a network connection to a network, the device located with a user:
   determining a status of the user, the status indicating an activity state or a non-activity state of the user;
   when the status indicates the activity state, activating an activity mode on the device that restricts select types of mobile data traffic and tracks at least one parameter corresponding to a motion of the device that is related to the user performing an activity; and
   identifying a predetermined condition based on the at least one parameter corresponding to the motion of the device that is related to the user performing the activity, wherein during the activity mode the device restricts further types of mobile data traffic based on identifying the predetermined condition.

2. The method of claim 1, wherein the activity state includes a first activity state that the activity is to be performed, a second activity state that the activity is being performed or a third activity state that the activity has been paused.

3. The method of claim 2, wherein the status is determined based on a manual input, an automatic determination, or a combination thereof.

4. The method of claim 3, wherein the manual input includes an indication of one of the first activity state, the second activity state or the third activity state.

5. The method of claim 3, wherein identifying the predetermined condition is further based on an implicit detection of one or more network metric measurements over a period of time.

6. The method of claim 5, wherein the network metric measurements include a receive channel signal variation or stabilization, a number of out of service events, a number of radio link failures, a number of cell selections, a number of cell reselections, a number of radio access technology ping pongs, or a combination thereof.

7. The method of claim 3, wherein identifying the predetermined condition is based on a motion co-processor, a sensor, or a combination thereof.

8. The method of claim 1, further comprising:
   deactivating the activity mode based on identifying that the activity has ended; and
   activating a connected mode that removes the restrictions of the activity mode.

9. The method of claim 1, wherein the activity mode is a first activity mode, wherein restricting select types of mobile data traffic includes utilizing an intermediary setting to allow mobile terminating data traffic, allow user initiated mobile originating data traffic, and prevent background mobile originating data traffic and wherein restricting further types of mobile data traffic includes utilizing a restricted setting to prevent non-emergency related mobile originating data traffic and filter mobile terminating data traffic for emergency related mobile terminating data traffic.

10. The method of claim 9, further comprising:
    activating a guard timer when the restricted setting has started to be used, the guard time indicating a maximum duration of time in which the restricted setting is to be used.

11. The method of claim 10, further comprising:
    activating a backoff timer when the guard timer has expired, the backoff timer indicating a duration of time in which the restricted setting is prevented from being used.

12. The method of claim 1, wherein the activity mode is a second activity mode, wherein restricting select types of mobile data traffic includes utilizing an intermediary setting to allow mobile terminating data traffic, allow user initiated mobile originating data traffic, and prevent background mobile originating data traffic and wherein restricting further types of mobile data traffic includes utilizing a restricted setting to prevent non-emergency related mobile originating data traffic and filter mobile terminating data traffic for emergency related mobile terminating data traffic,
    wherein the second activity mode uses a network lock to limit types of network characteristics that are used in establishing a connection.

13. The method of claim 12, wherein the network characteristics include a radio access technology, a cell, a frequency, or a combination thereof.

14. The method of claim 12, wherein the second activity mode utilizes the intermediary setting in first time periods while the network lock is used and utilizes the restricted setting during second, remaining time periods.

15. The method of claim 14, wherein the second time periods are when the network lock is determined to prevent a predetermined minimum level of service.

16. The method of claim 1, wherein the activity mode is a third activity mode, wherein the third activity mode utilizes a restricted setting to prevent non-emergency related mobile originating data traffic and filter mobile terminating data traffic for emergency related mobile terminating data traffic.

17. The method of claim 16, further comprising:
    receiving a user initiated mobile originating emergency session input;
    exiting the restricted setting;
    entering a connected setting; and
    establishing an emergency session.

18. The method of claim 17, further comprising:
    completing the emergency session;
    activating a callback timer to remain in the connected setting, the callback timer defining a period of time in which an emergency center is capable of initiating a further emergency session.

19. A device located with a user, the device comprising:
    a transceiver configured to establish a connection to a network; and
    a processor configured to perform operations, comprising:
    determining a status of the user, the status indicating an activity state or a non-activity state of the user;
    when the status indicates the activity state, the processor activating an activity mode on the device that restricts select types of mobile data traffic and tracks at least one parameter corresponding to a motion of the device that is related to the user performing an activity identifying a predetermined condition based on the at least one parameter corresponding to the motion of the device that is related to the user performing the activity, wherein during the activity mode the device restricts further types of mobile data traffic based on identifying the predetermined condition.

20. A device located with a user, the device comprising:

first circuitry for establishing a connection to a network;

second circuitry for determining a status of the user, the status indicating an activity state or a non-activity state of the user;

when the status indicates the activity state, third circuitry for activating an activity mode on the device that restricts select types of mobile data traffic and tracks at least one parameter corresponding to a motion of the device that is related to the user performing an activity; and identifying a predetermined condition based on the at least one parameter corresponding to the motion of the device that is related to the user performing the activity, wherein during the activity mode the device restricts further types of mobile data traffic based on identifying the predetermined condition.

* * * * *

UNITED STATES PATENT AND TRADEMARK OFFICE
CERTIFICATE OF CORRECTION

PATENT NO. : 10,512,025 B2
APPLICATION NO. : 15/812369
DATED : December 17, 2019
INVENTOR(S) : Lovlekar et al.

Page 1 of 1

It is certified that error appears in the above-identified patent and that said Letters Patent is hereby corrected as shown below:

In the Claims

Claim 15, Column 28, Line 39:
"periods are when the network lock is deter mined to prevent" should read "periods are when the network lock is determined to prevent"

Signed and Sealed this
Fourteenth Day of April, 2020

Andrei Iancu
*Director of the United States Patent and Trademark Office*